US006829609B1

(12) United States Patent
Wagner

(10) Patent No.: US 6,829,609 B1
(45) Date of Patent: Dec. 7, 2004

(54) SYSTEM, DEVICE, AND METHOD FOR PROVIDING MUTUAL EXCLUSION FOR COMPUTER SYSTEM RESOURCES

(75) Inventor: Michael P. Wagner, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/480,390

(22) Filed: Jan. 11, 2000

(51) Int. Cl.[7] .............................................. G08F 17/30
(52) U.S. Cl. ............................................ 707/8; 707/10
(58) Field of Search ......................... 707/8, 10, 9, 201

(56) References Cited

U.S. PATENT DOCUMENTS

| 5,586,318 | A | * | 12/1996 | Toutonghi ................... 718/107 |
| 5,706,511 | A | * | 1/1998 | Tomoda ....................... 707/205 |
| 6,026,401 | A | * | 2/2000 | Brealey et al. ................. 707/8 |
| 6,173,442 | B1 | * | 1/2001 | Agesen et al. ............... 717/141 |
| 6,223,204 | B1 | * | 4/2001 | Tucker ........................ 707/103 |
| 6,247,025 | B1 | * | 6/2001 | Bacon ......................... 707/206 |

FOREIGN PATENT DOCUMENTS

EP          969369 A2  *  1/2000  ....................... 9/46

OTHER PUBLICATIONS

Kawachiya et al. (Lock reservation: Java Locks can mostly do without atomic operations) ACM Press, Year: 2002, pp.: 130 141.*

* cited by examiner

Primary Examiner—Jean M. Corrielus
Assistant Examiner—Baoquoc N. To
(74) Attorney, Agent, or Firm—Bromberg & Sunstein LLP

(57) ABSTRACT

A system, device, and method for providing mutual exclusion for computer system resources utilizes a lock mechanism in which a process that does not own a particular resource creates a lock for the resource upon receiving an inquiry from another process. The lock may be a full instantiation of a lock or a partial instantiation of a lock. In either case, the lock indicates, among other things, the owner process for the resource. When the non-owner process requires access to the resource, the non-owner process uses the lock to determine the owner process and sends a request to the owner process requesting access to the resource.

12 Claims, 19 Drawing Sheets

(1200) - IMPLICIT MECHANISM TO DETERMINE OWNER

FIG. 2 (200) - ACCESSING A RESOURCE BY A PRIOR ART LOCAL PROCESS

FIG. 3 (300) - PROCESSING AN INQUIRY BY A PRIOR ART REMOTE PROCESS

FIG. 4 (400) - CREATING AN OWNER LOCK BY A LOCAL PROCESS

FIG. 5 (500) - CREATING A GHOST LOCK BY A REMOTE PROCESS

FIG. 6 (600) - UPGRADING A GHOST LOCK TO A REFERENCE LOCK

FIG. 7 (700) - ACCESSING A RESOURCE

FIG. 8 (800) - PROCESSING AN INQUIRY

FIG. 9 (900) - PROCESSING A REQUEST

FIG. 10 (1000) - RESOLVING A COLLISION CONDITION

FIG. 11 (1100) - EXPLICIT NOTIFICATION MECHANISM TO DETERMINE OWNER

FIG. 12 (1200) - IMPLICIT MECHANISM TO DETERMINE OWNER

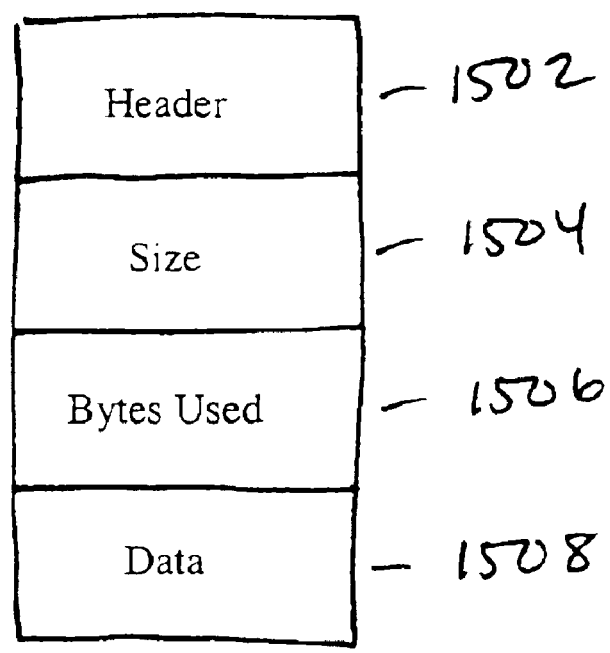
FIG. 15 (1500) - LOCK MAILBOX DATA STRUCTURE

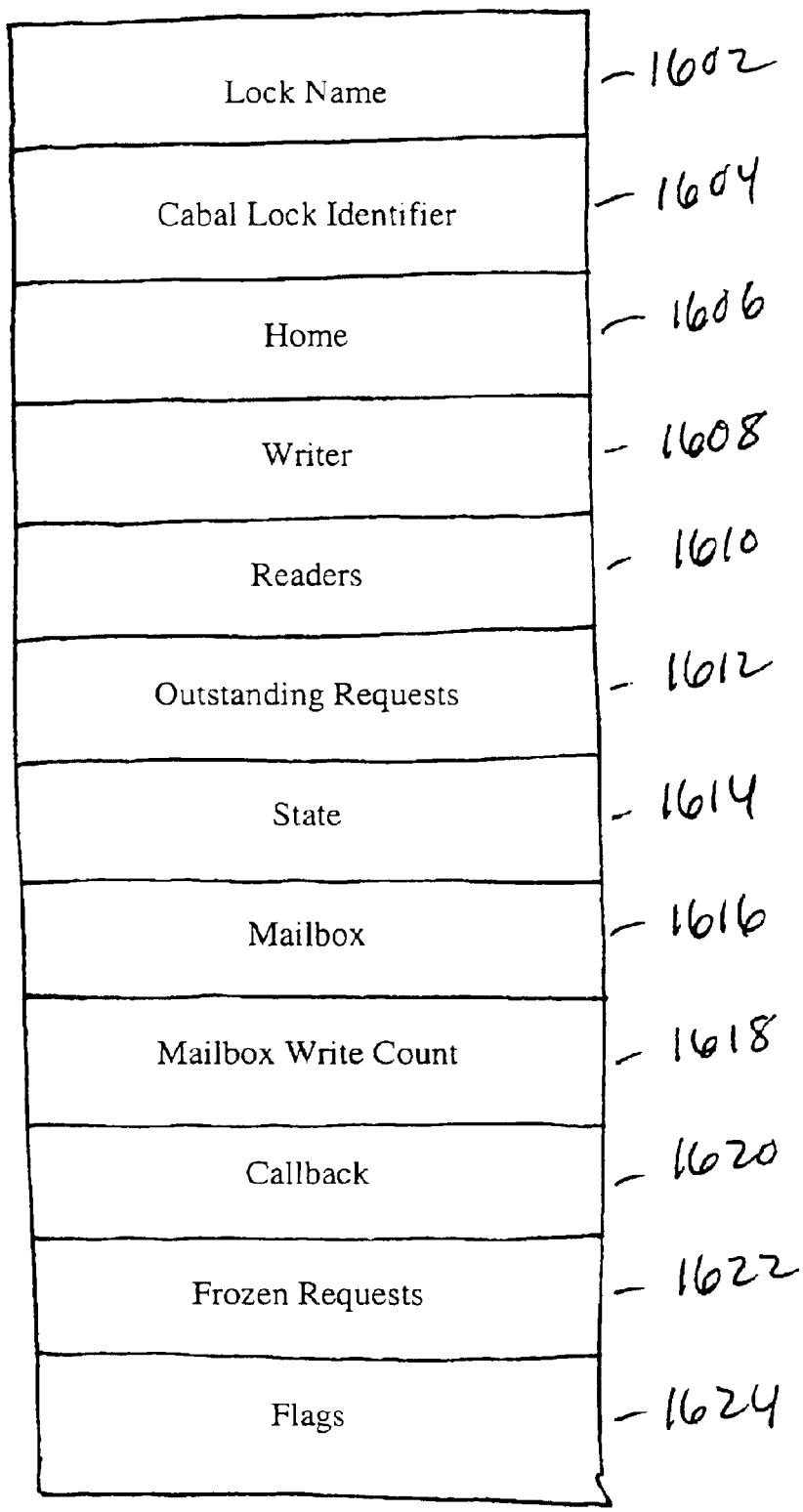
FIG. 16 (1600) - LOCK DATA STRUCTURE

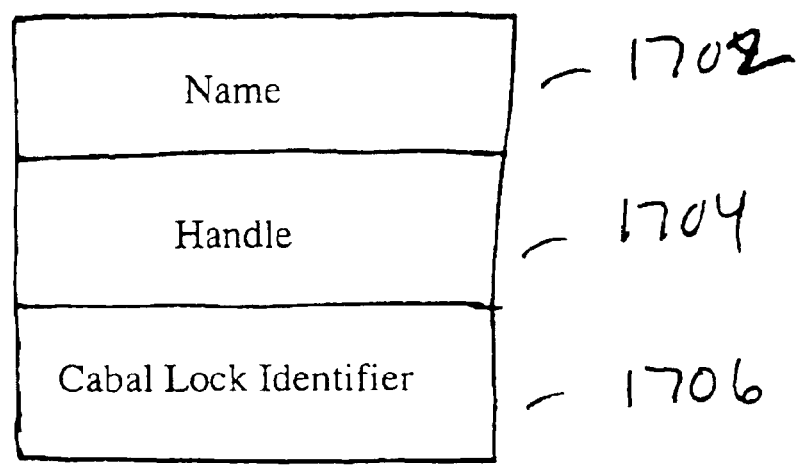
FIG. 17 (1700) - LOCK MAP ENTRY DATA STRUCTURE

| | |
|---|---|
| Lock Name indicates the name of the lock | -1802 |
| Cabal Lock Identifier indicates the cabal-wide identifier for the lock | -1804 |
| Home indicates the owner of the lock | -1806 |
| Writer indicates any SP that reserved the resource for writing | -1808 |
| Readers indicates any SP(s) that reserved the resource for reading | -1810 |
| Outstanding Requests lists any outstanding requests for the lock | -1812 |
| State indicates the state of the lock | -1814 |
| Mailbox points to a corresponding lock mailbox | -1816 |
| Mailbox Write Count indicates the number of write accesses granted | -1818 |
| Callback indicates a callback routine | -1820 |
| Frozen Requests lists any requests received while lock is frozen | -1822 |
| Flags | -1824 |

FIG. 18 (1800) - OWNER/REFERENCE LOCK

| | |
|---|---|
| Lock Name indicates the name of the lock | -1902 |
| Cabal Lock Identifier indicates the cabal-wide identifier for the lock | -1904 |
| Home indicates the owner of the lock | -1906 |
| Writer = NULL | -1908 |
| Readers = NULL | -1910 |
| Outstanding Requests = NULL | -1912 |
| State indicates that the lock is a ghost lock | -1914 |
| Mailbox = NULL | -1916 |
| Mailbox Write Count = NULL | -1918 |
| Callback = NULL | -1920 |
| Frozen Requests = NULL | -1922 |
| Flags = NULL | -1924 |

FIG. 19 (1900) - GHOST LOCK

SYSTEM, DEVICE, AND METHOD FOR PROVIDING MUTUAL EXCLUSION FOR COMPUTER SYSTEM RESOURCES

FIELD OF THE INVENTION

The present invention relates generally to computer systems, and more particularly to providing mutual exclusion for computer system resources.

BACKGROUND OF THE INVENTION

Many computer systems include various resources that must be shared among multiple processes. For example, files, data structures, memory locations, disks, and peripherals are often shared among multiple processes. Such processes may run on the same processor within a particular device, on different processors within the same device, or on different processors within different devices.

In many cases in the prior art, certain types of accesses to such shared resources must be restricted to one process at a time. This is often referred to as "mutual exclusion." One type of mutual exclusion, for example, allows only one process to write to a particular resource at any given time (although multiple processes may be allowed to read from the resource). Mutual exclusion may be required, for example, to prevent multiple processes from interfering with one another or to prevent multiple processes from making conflicting or inconsistent changes to the resource.

One way to provide mutual exclusion for such shared resources utilizes a distributed lock mechanism. One process, typically the first process that requires access to the resource, becomes the "owner" of the resource. The owner process coordinates all access to the resource. When a non-owner process requires access to the resource, the non-owner process sends a request to the owner process requesting access to the resource. The owner process either grants or denies access to the resource based upon such considerations as the type of access requested and the resource state (reserved or unreserved).

Each process that requires access to a particular resource, including the owner process and any non-owner process(es), maintains a "lock" for the resource. A lock is typically a data structure that is maintained in a memory. The lock indicates, among other things, the owner process for the resource. Thus, a lock maintained by a non-owner process includes a reference to the owner process. In order to distinguish between a lock maintained by the owner process and a lock maintained by a non-owner process, the lock maintained by the owner process is referred to hereinafter as the "owner" lock, while a lock maintained by a non-owner process is referred to hereinafter as a "reference" lock.

The lock for a particular resource may be created as part of an investigation procedure that is performed by a process the first time it requires access to the resource. In such an investigation procedure, the process sends an inquiry to the other processes inquiring whether one of the other processes owns the resource. If none of the other processes owns the resource, then the process becomes the owner for the resource, and creates an owner lock for the resource. If one of the other processes owns the resource, then the process creates a reference lock for the resource, and sends a request to the owner process to request access to the resource.

One problem with such a prior art lock mechanism is that it requires two transaction exchanges when a process requires access to a resource that is owned by another process. Specifically, the process first sends an inquiry to the other processes to inquire whether another process owns the resource, and then sends a request to the owner process to request access to the resource. This is time-consuming, and adds to inter-process communication overhead.

Thus, a simpler lock mechanism that requires only one transaction exchange for a process to reserve the resource would be useful, and is provided by the present invention.

SUMMARY OF THE INVENTION

In accordance with one aspect of the present invention, mutual exclusion for resources in a computer system is provided using a distributed lock mechanism in which a first process to request access to a resource becomes the owner of the resource, and other processes must request access to the resource through the owner process. In order to expedite access to the resource, a non-owner process creates a lock upon receiving an inquiry from another process. The lock indicates, among other things, the owner process for the resource. Thereafter, when the process requires access to the resource, the process uses the lock to determine the owner process for the resource, and sends a request to the owner process requesting access to the resource. In this way, the process does not need to send a separate inquiry to determine whether another process owns the resource.

BRIEF DESCRIPTION OF THE DRAWINGS

The foregoing and other objects and advantages of the invention will be appreciated more fully from the following further description thereof with reference to the accompanying drawings wherein:

FIG. 15 is a block diagram showing an exemplary lock mailbox data structure in accordance with an embodiment of the present invention;

FIG. 16 is a block diagram showing an exemplary lock data structure in accordance with an embodiment of the present invention;

FIG. 17 is a block diagram showing an exemplary lock map entry data structure in accordance with an embodiment of the present invention;

FIG. 18 is a block diagram showing the fields of an initialized owner or reference lock in accordance with an embodiment of the present invention; and FIG. 19 is a block diagram showing the fields of an initialized ghost lock in accordance with an embodiment of the present invention.

DETAILED DESCRIPTION OF A PREFERRED EMBODIMENT

In an embodiment of the present invention, a non-owner process creates a lock for a particular resource upon learning that another process is becoming the owner of the resource. The lock indicates, among other things, the owner process for the resource. With the lock in place, the non-owner process does not have to send an inquiry when it requires access to the resource. Instead, the non-owner process proceeds to send a request to the owner process requesting access to the resource. This saves time and reduces the inter-process communication overhead.

In a preferred embodiment of the present invention, a non-owner process is not permitted to create a full reference lock until it requires access to the resource. This is because the non-owner process does not have certain essential information (described below) until it requires access to the resource. Therefore, the non-owner process creates a "ghost" lock for the resource upon learning that another process is becoming the owner of the resource, and particularly upon receiving an inquiry from another process as part of an investigation procedure. The ghost lock is a partial instantiation of a lock that is essentially a placeholder for establishing a reference lock when the non-owner process requires access to the resource at a later time. Like a full reference lock, the ghost lock indicates, among other things, the owner process for the resource. The first time the non-owner process requires access to the resource, the non-owner process uses the ghost lock to determine the owner process for the resource, and sends a request to the owner process requesting access to the resource. The non-owner process then upgrades the ghost lock to a full reference lock.

An Exemplary Computer System Having Two Processes

Figure 1:
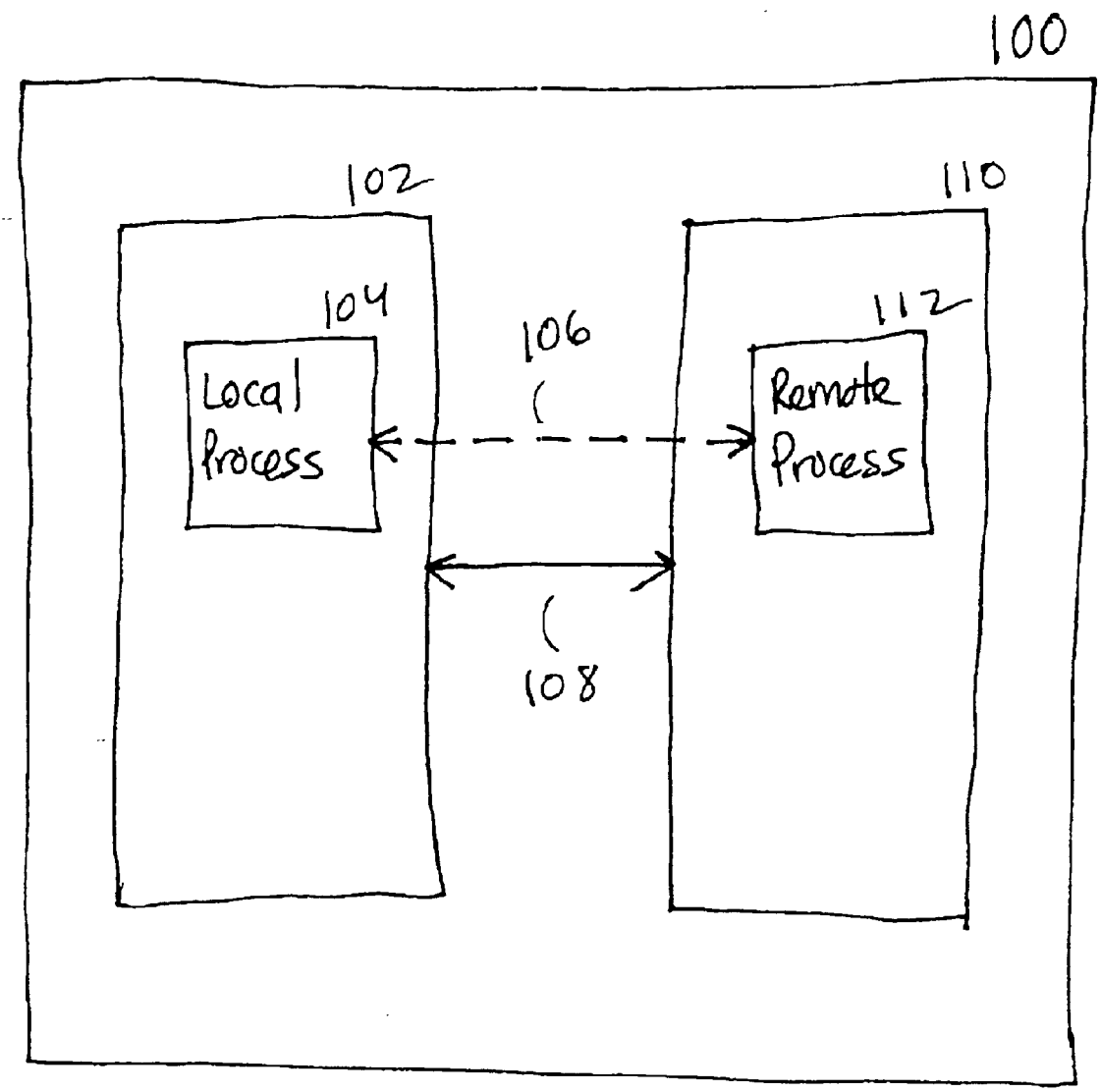
FIG. 1 is a block diagram showing an exemplary computer system having two processes in accordance with an embodiment of the present invention.

FIG. 1 shows an exemplary computer system 100 having two processes, namely the local process 104 and the remote process 112. It should be noted that the designations "local" and "remote" are for convenience only for differentiating the two processes in describing a number of transactions between the two processes. In this exemplary computer system 100, the local process 104 runs on a first processor 102, while the remote process 112 runs on a second processor 110. The processors (102, 110) are interconnected over an interface 108, such as a communication network, bus, or backplane. The local process 104 and the remote process 112 communicate over a communication channel 106 that is supported over the interface 108.

Accessing a Resource by a Prior Art Local Process

Figure 2:
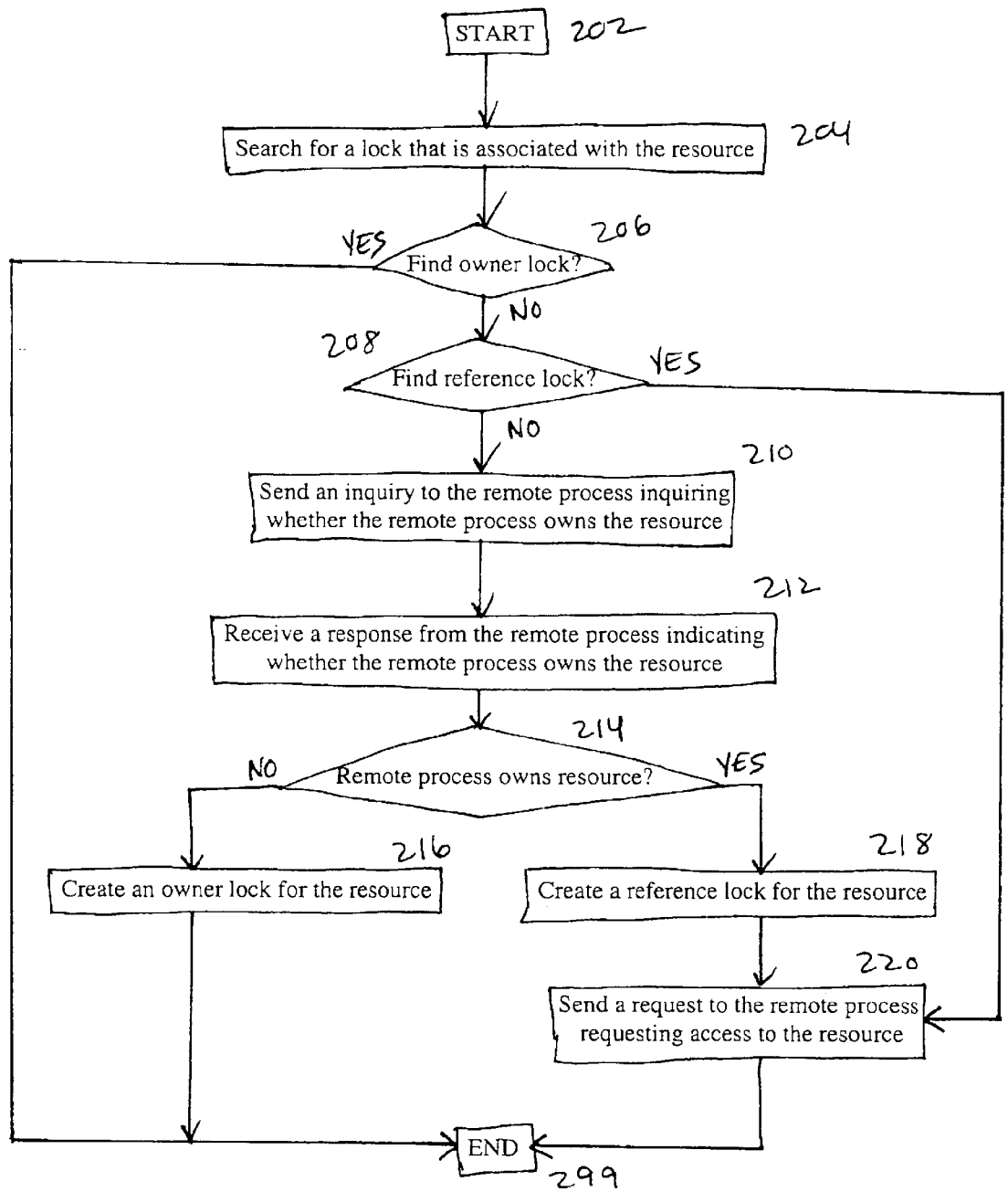
FIG. 2 is a logic flow diagram showing exemplary logic for accessing a resource by a local process as known in the art.

FIG. 2 is a logic flow diagram showing exemplary logic 200 for accessing a resource by the local process 104 in accordance with a prior art embodiment. Beginning at step 202, the logic searches for a lock that is associated with the resource, in step 204. If the logic finds an owner lock (YES in step 206), then the logic uses the owner lock to either grant or deny access to the resource. If the logic does not find an owner lock (NO in step 206) but instead finds a reference lock (YES in step 208), then the logic sends a request to the remote process 112 requesting access to the resource, in step 220, and either grants or denies access to the resource as indicated by the remote process. If the logic finds neither an owner lock nor a reference lock (NO in step 208), then the logic sends an inquiry to the remote process inquiring whether the remote process owns the resource, in step 210, and receives a response from the remote process indicating whether the remote process owns the resource, in step 212. If the remote process does not own the resource (NO in step 214), then the logic creates an owner lock for the resource, in step 216, and grants access to the resource. If the remote process owns the resource (YES in step 214), then the logic creates a reference lock for the resource, in step 218, sends a request to the remote process 112 requesting access to the resource, in step 220, and either grants or denies access to the resource as indicated by the remote process. The logic 200 terminates in step 299.

Processing an Inquiry by a Prior Art Remote Process

Figure 3:
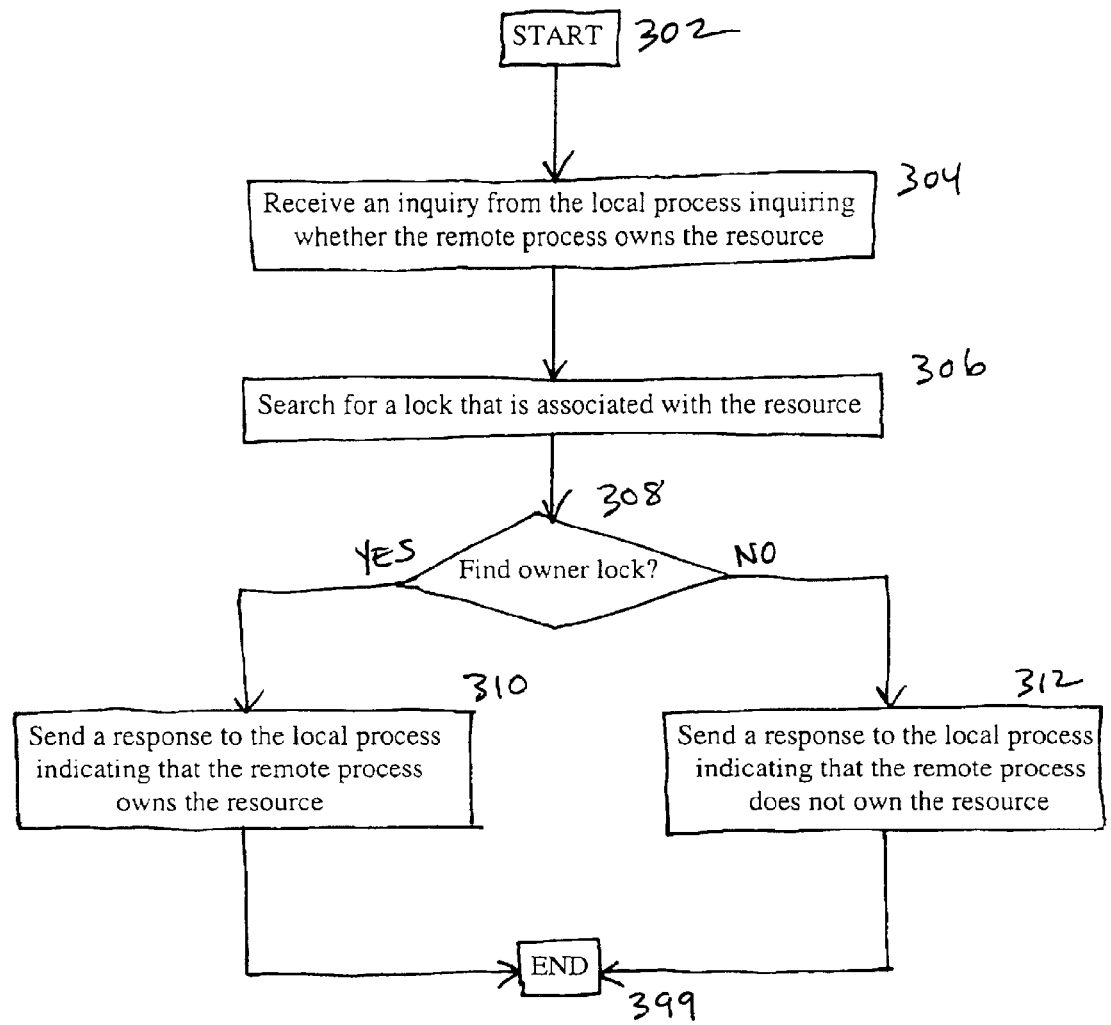
FIG. 3 is a logic flow diagram showing exemplary logic for processing an inquiry by a remote process as known in the art.

FIG. 3 is a logic flow diagram showing exemplary logic 300 for accessing a resource by the local process 112 in accordance with a prior art embodiment. Beginning at step 302, and upon receiving an inquiry from the local process 104 inquiring whether the remote process 112 owns the resource, in step 304, the logic searches for a lock that is associated with the resource, in step 306. If the logic finds an owner lock for the resource (YES in step 308), then the logic sends a response to the local process 104 indicating that the remote process 112 owns the resource, in step 310. If the logic does not find an owner lock for the resource (NO in step 308), then the logic sends a response to the local process 104 indicating that the remote process 112 does not own the resource, in step 312. The logic 300 terminates in step 399.

Lock Maintenance in a Dual Process Computer System

Various aspects of the present invention can be demonstrated by example. The logic described hereinafter reflects certain assumptions that can be made by both processes in a dual process computer system, such as the computer system 100. For example, if the remote process 112 receives an inquiry from the local process 104 regarding a resource that is not owned by the remote process 112, then the remote process 112 can assume that the local process 104 will become the owner of the resource and create an owner lock for the resource, and therefore the remote process 112 can create a ghost lock indicating that the local process 104 owns the resource. Similarly, if the local process 104 sends an inquiry to the remote process 112 regarding a particular resource and determines that the remote process 112 is not the owner of the resource, then the local process 104 can create an owner lock for the resource as the owner of the resource.

Such assumptions cannot necessarily be made by processes in a computer system having more than two processes. For example, if the remote process 112 receives an inquiry from the local process 104 regarding a resource that is not owned by the remote process 112, then the remote process 112 cannot simply assume that the local process 104 will become the owner of the resource because a third process may already own the resource, and therefore the remote process 112 cannot create a ghost lock for the resource until it determines the owner process for the resource using a different mechanism. Similarly, if the local process 104 sends an inquiry to all other processes, including the remote process 112, regarding a particular resource and determines that the remote process 112 is not the owner of the resource, then the local process 104 cannot simply become the owner of the resource and create an owner lock for the resource because a third process may already own the resource, and therefore the local process 104 must first determine whether or not it is the owner for the resource using a different mechanism before it can create an owner lock or a ghost lock for the resource, respectively. Therefore, additional mechanisms must be employed in order to determine the owner of a particular resource in a computer system having more than two processes. Such additional mechanisms will be discussed below.

Returning to the computer system 100 having two processes, and with reference again to FIG. 1, neither the local process 104 nor the remote process 112 initially maintain a lock for a particular resource. When the local process 104 requires access to the resource, the local process 104 searches its memory for a lock that is associated with the resource. Since the local process 104 does not yet maintain a lock for the resource, the local process 104 sends an inquiry to the remote process 112 to inquire whether the remote process 112 owns the resource. Since the remote process 112 also does not yet maintain a lock for the resource, the remote process 112 sends a response indicating that the remote process 112 does not own the resource. The local process 104 creates an owner process for the resource. The remote process 112 creates a ghost lock for the resource indicating that the local process 104 owns the resource.

Creating an Owner Lock by the Local Process

Figure 4:
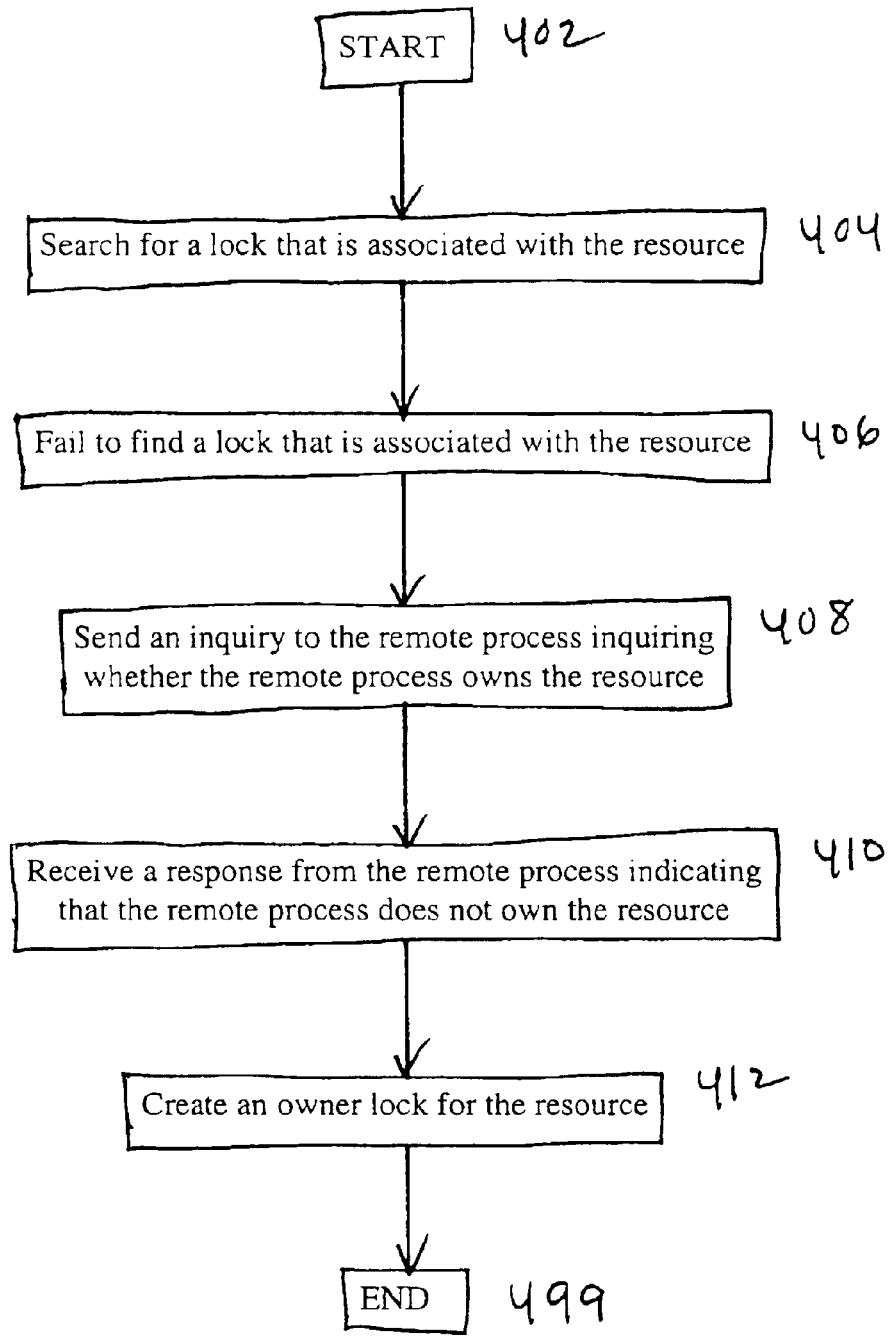
FIG. 4 is a logic flow diagram showing exemplary logic for creating an owner lock by a local process in accordance with an embodiment of the present invention.

FIG. 4 is a logic flow diagram showing exemplary logic 400 for creating an owner lock by a local process, such as the local process 104. Beginning at step 402, the logic searches for a lock that is associated with the resource, in step 404. Upon failing to find a lock that is associated with the resource, in step 406, the logic sends an inquiry to the remote process 112 inquiring whether the remote process 112 owns the resource, in step 408. Upon receiving a response from the remote process 112 indicating that the remote process 112 does not own the resource, in step 410, the logic proceeds to create an owner lock for the resource, in step 412. The logic 400 terminates in step 499.

Creating a Ghost Lock by the Remote Process

Figure 5:
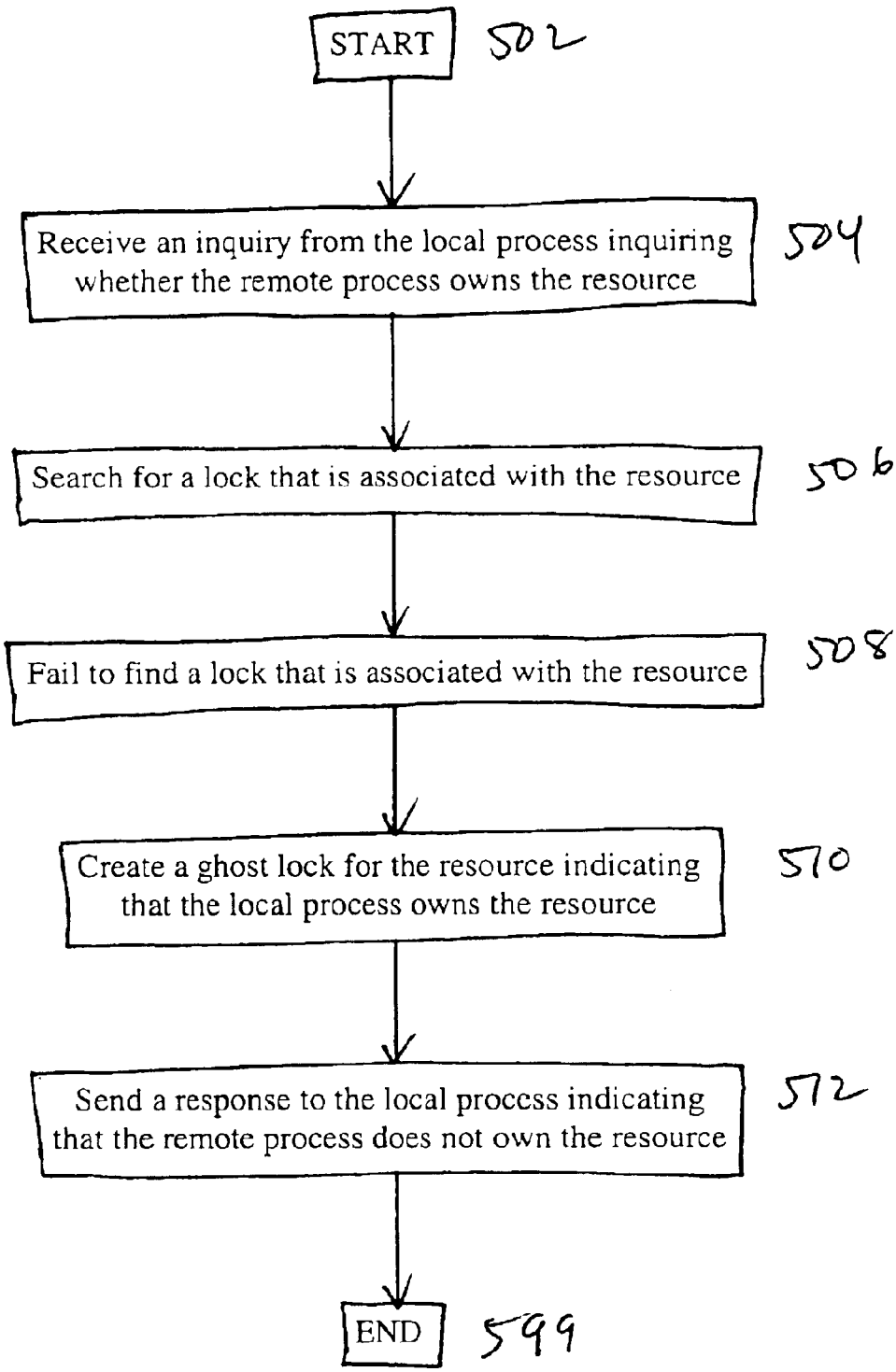
FIG. 5 is a logic flow diagram showing exemplary logic for creating a ghost lock by a remote process in accordance with an embodiment of the present invention.

FIG. 5 is a logic flow diagram showing exemplary logic 500 for creating a ghost lock by a remote process, such as the remote process 112. Beginning at step 502, and upon receiving an inquiry from the local process 104 inquiring whether the remote process 112 owns the resource, in step 504, the logic searches for a lock that is associated with the resource. Upon failing to find a lock that is associated with the resource, in step 508, the logic proceeds to create a ghost lock for the resource indicating that the local process 104 owns the resource, in step 510, and sends a response to the local process 104 indicating that the remote process does not own the resource, in step 512. The logic 500 terminates in step 599.

Upgrading the Ghost Lock by the Remote Process

Thereafter, when the remote process 112 requires access to the resource, the remote process 112 searches for a lock that is associated with the resource. Upon finding a ghost lock for the resource indicating that the local process 104 owns the resource, the remote process 112 upgrades the ghost lock to a full reference lock and sends a request to the local process 104 requesting access to the resource.

Figure 6:
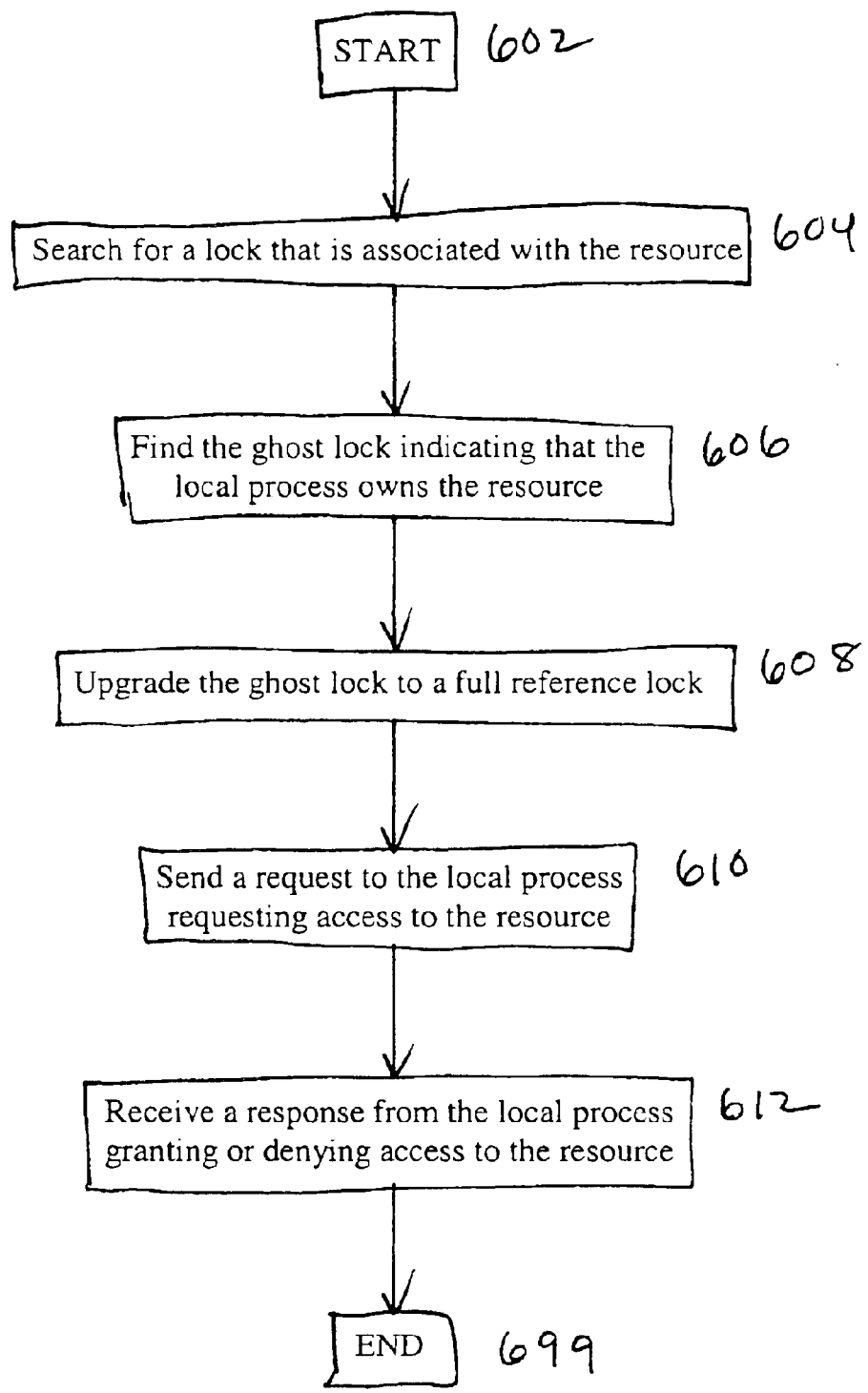
FIG. 6 is a logic flow diagram showing exemplary logic for upgrading a ghost lock to a reference lock in accordance with an embodiment of the present invention.

FIG. 6 is a logic flow diagram showing exemplary logic 600 for upgrading a ghost lock to a reference lock by a remote process, such as the remote process 112. Beginning at step 602, the logic searches for a lock that is associated with the resource, in step 604. Upon finding the ghost lock indicating that the local process 104 owns the resource, in step 606, the logic upgrades the ghost lock to a full reference lock, in step 608, and sends a request to the local process 104 requesting access to the resource, in step 610. The logic receives a response from the local process 104 granting or denying access to the resource, in step 612. The logic 600 terminates in step 699.

Logic for Accessing a Resource

Thus, when a process requires access to a resource, the process searches for a lock that is associated with the resource. The process may find an owner lock, a reference lock, a ghost lock, or no lock for the resource. If the process finds an owner lock for the resource, then the process uses the owner lock to decide whether to grant or deny access to the resource. If the process finds a reference lock for the resource, then the process sends a request to the owner process requesting access to the resource. If the process finds a ghost lock for the resource, then the process upgrades the ghost lock to a full reference lock, and sends a request to the owner process requesting access to the resource. If the process finds no lock for the resource, then the process sends an inquiry to the other process, and creates either an owner lock for the resource, if the other process does not already own the resource, or a reference lock, if the other process already owns the resource.

Figure 7:
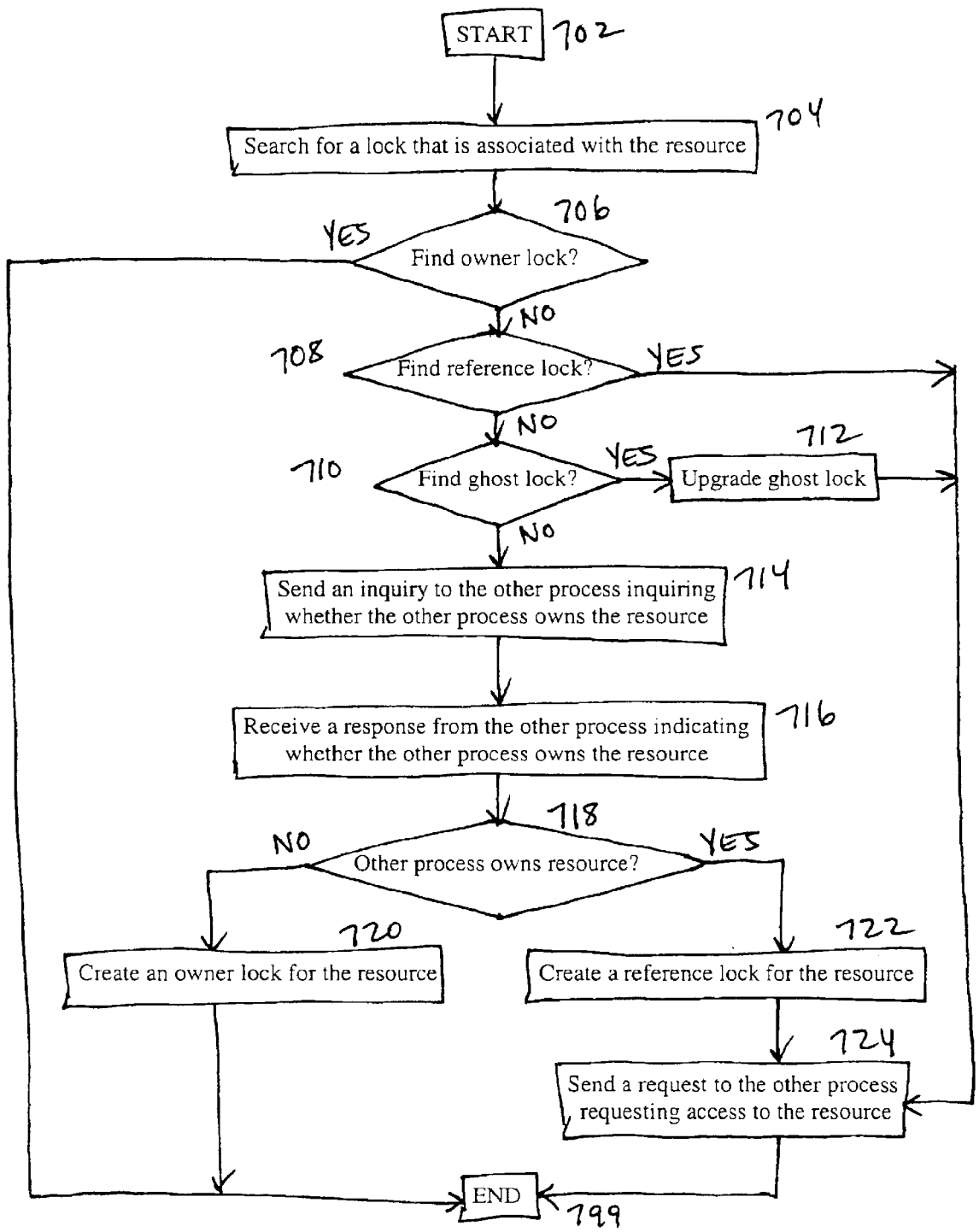
FIG. 7 is a logic flow diagram showing exemplary logic for accessing a resource by a process in accordance with an embodiment of the present invention.

FIG. 7 is a logic flow diagram showing exemplary logic 700 for accessing a resource by a process. Beginning at step 702, the logic searches for a lock that is associated with the resource, in step 704. If the logic finds an owner lock (YES in step 706), then the logic uses the owner lock to either grant or deny access to the resource. If the logic does not find an owner lock (NO in step 706) but instead finds a reference lock (YES in step 708), then the logic sends a request to the other process requesting access to the resource, in step 724. If the logic does not find a reference lock (NO in step 708) but instead finds a ghost lock (YES in step 710), then the logic upgrades the ghost lock to a full reference lock, in step 712, and sends a request to the other process request access to the resource, in step 724. If the logic does not find a ghost lock (NO in step 710), then the logic sends an inquiry to the other process inquiring whether the other process owns the resource, in step 714, and receives a response from the other process indicating whether the other process owns the resource, in step 716. If the other process does not own the resource (NO in step 718), then the logic creates an owner lock for the resource, in step 720, and grants access to the resource. If the other process owns the resource (YES in step 718), then the logic creates a reference lock for the resource, in step 722, sends a request to the other process requesting access to the resource, in step 724, and either grants or denies access to the resource as indicated by the other process. The logic 700 terminates in step 799.

Logic for Processing an Inquiry

When a process receives an inquiry from the other process, the process searches for a lock that is associated with the resource. Under normal operating conditions, the process may find an owner lock or no lock for the resource (the process should not find a reference lock or a ghost lock during normal operating conditions). If the process finds an owner lock, then the process simply sends a response to the other process indicating that the process owns the resource. If the process finds no lock for the resource, then the process creates a ghost lock for the resource indicating that the other process owns the resource, and sends a response to the other process indicating that the process does not own the resource.

Figure 8:
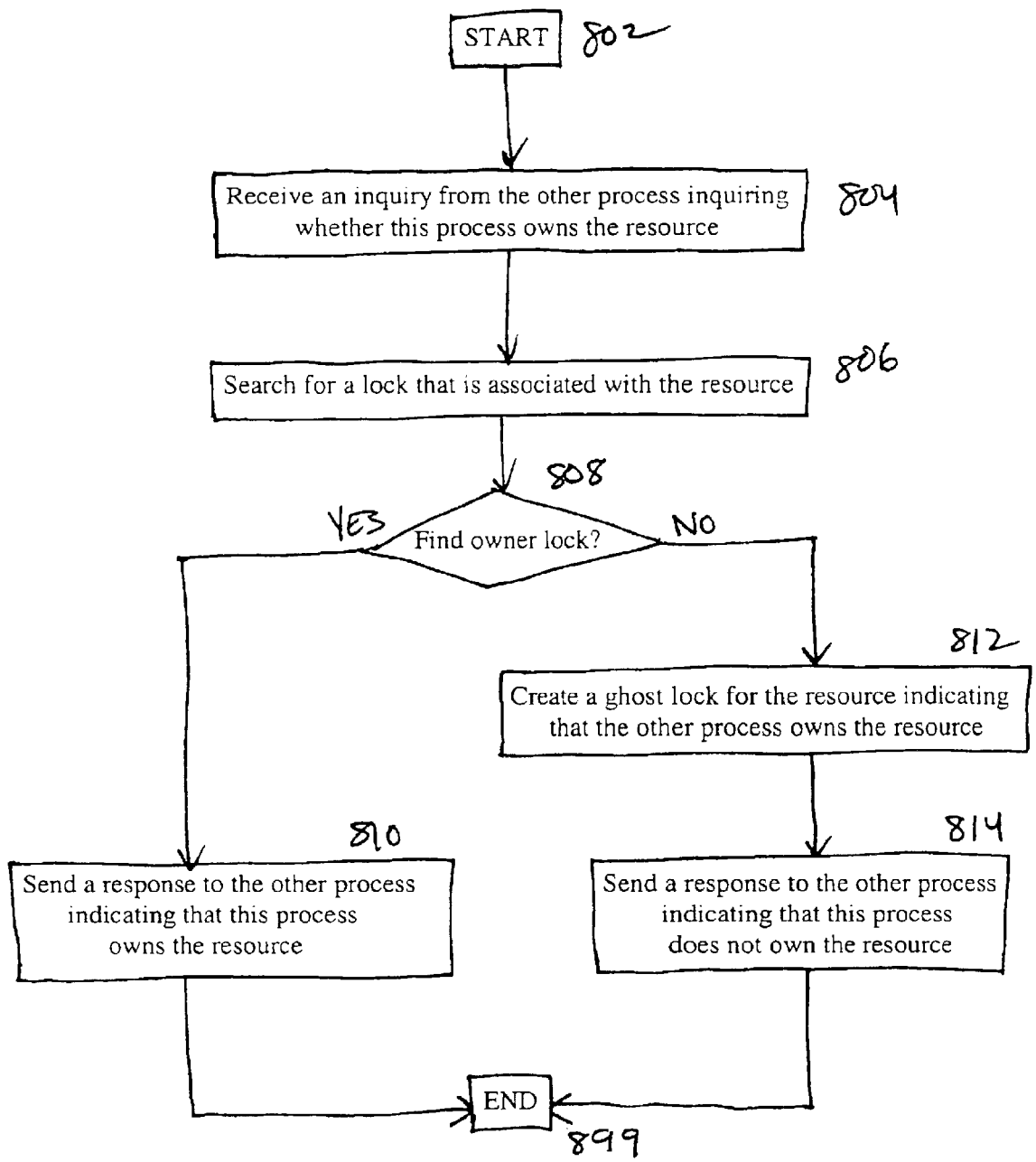
FIG. 8 is a logic flow diagram showing exemplary logic for processing an inquiry by a process in accordance with an embodiment of the present invention.

FIG. 8 is a logic flow diagram showing exemplary logic 800 for processing an inquiry by a process. Beginning at step 802, and upon receiving an inquiry from the other process inquiring whether this process owns the resource, in step 804, the logic searches for a lock that is associated with the resource, in step 806. If the logic finds an owner lock (YES in step 808), then the logic sends a response to the other process indicating that this process owns the resource, in step 810. If the logic does not find an owner lock (NO in step 808), then the logic creates a ghost lock for the resource indicating that the other process owns the resource, in step 812, and sends a response to the other process indicating that this process does not own the resource, in step 814. The logic 800 terminates in step 899.

Logic for Processing a Request

When an owner process receives a request from the other process requesting access to the resource, the owner process finds the owner process that is associated with the resource, and determines whether to grant or deny access to the resource based upon the lock state and the type of access requested. The owner process sends a response indicating whether access is granted or denied.

Figure 9:
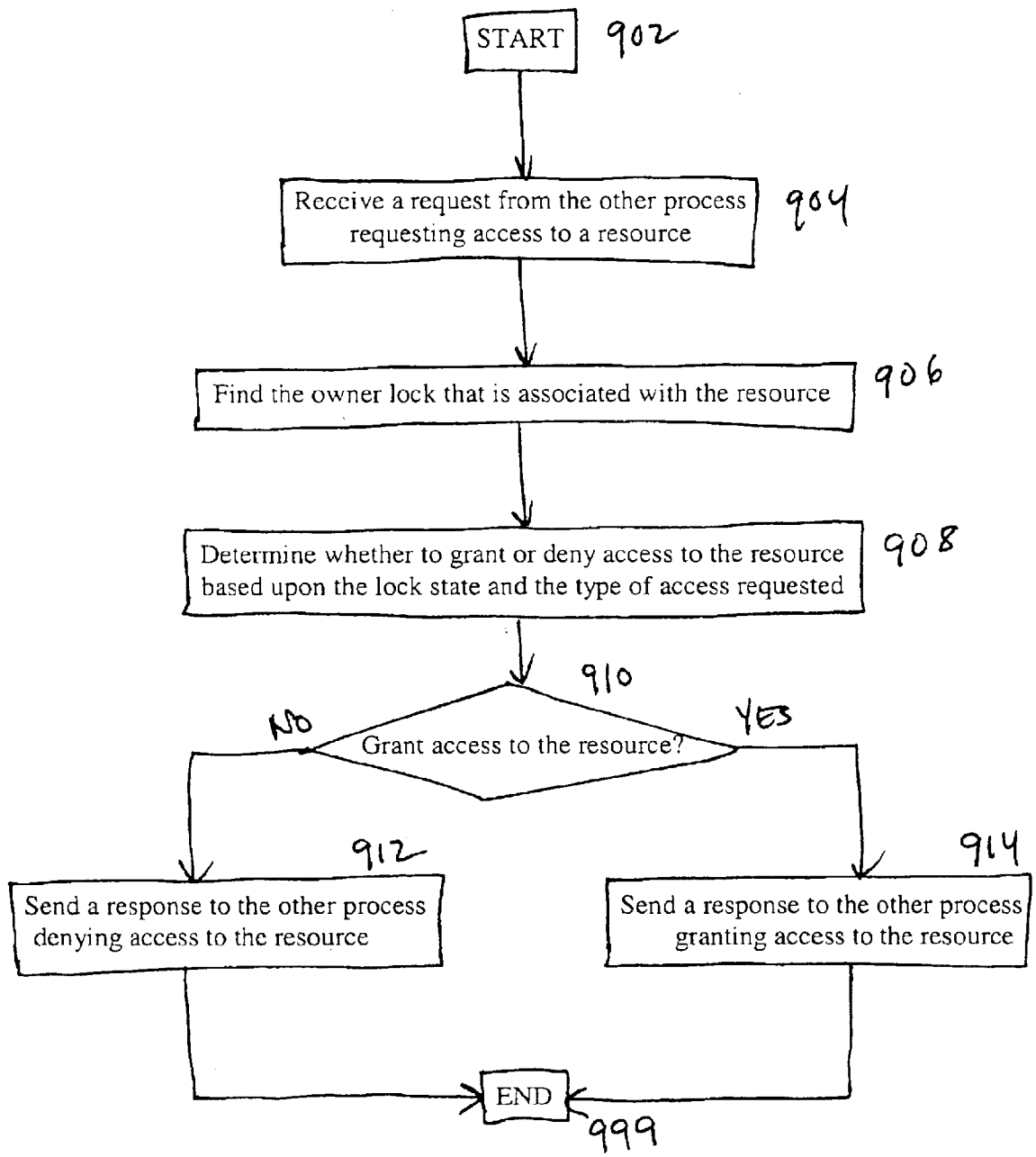
FIG. 9 is a logic flow diagram showing exemplary logic for processing a request by an owner process in accordance with an embodiment of the present invention.

FIG. 9 is a logic flow diagram showing exemplary logic 900 for process a request by an owner process. Beginning at step 902, and upon receiving a request from the other process requesting access to the resource, in step 904, the logic proceeds to find the owner lock that is associated with the resource, in step 906. The logic then determines whether to grant or deny access to the resource based upon the lock state and the type of access requested, in step 908. If the logic decides to deny access to the resource (NO in step 910), then the logic sends a response to the other process denying access to the resource, in step 912. If the logic decides to grant access to the resource (YES in step 910), then the logic sends a response to the other process granting access to the resource, in step 914. The logic 900 terminates in step 999.

Resolving a Collision During the Investigation Procedure

During the normal course of operation of the lock mechanism, it is possible for each process (104, 112) to begin the investigation procedure for the same resource at roughly the same time. Each process (104, 112) may detect such a "collision" condition, for example, by receiving an inquiry from the other process after sending an inquiry to the other process. Since only one of the processes (104, 112) can be the owner process for the resource, a predetermined priority scheme is used to select the owner process for the resource. The owner process creates an owner lock for the resource, while the other process creates a ghost lock for the resource.

Figure 10:
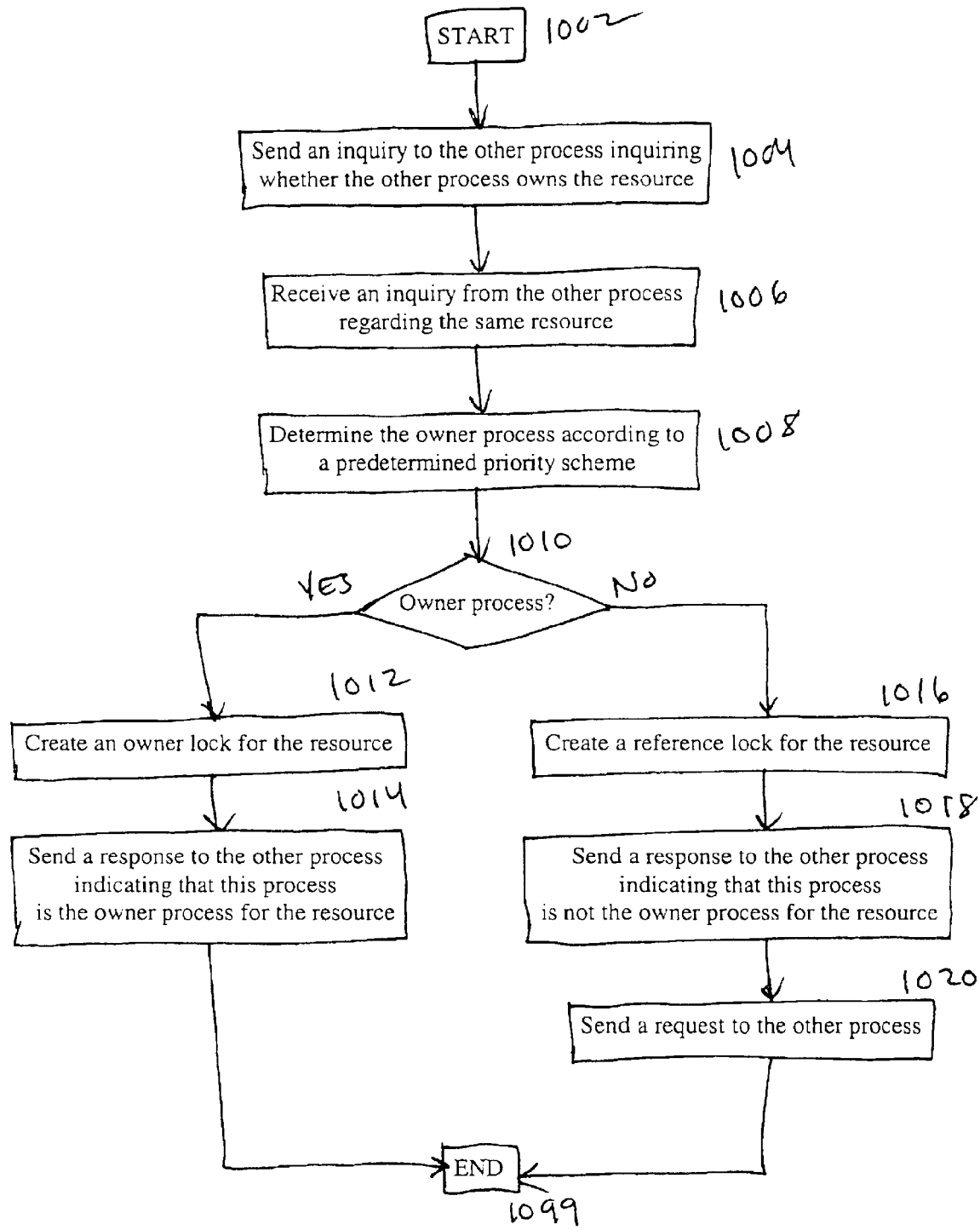
FIG. 10 is a logic flow diagram showing exemplary logic for resolving a "collision" condition in accordance with an embodiment of the present invention.

FIG. 10 is a logic flow diagram showing exemplary logic 1000 for resolving a "collision" condition. Beginning at step 1002, the logic sends an inquiry to the other process inquiring whether the other process owns the resource, in step 1004, specifically when the logic requires access to the resource and there is no lock associated with the resource (as in step 714 shown and described with reference to FIG. 7 above). If the logic receives an inquiry from the other process regarding the same resource, in step 1006, rather than receiving a response from the other process (as in step 716 shown and described with reference to FIG. 7 above), then the logic proceeds to determine the owner process for the resource according to a predetermined priority scheme, in step 1008. In an exemplary embodiment of the present invention, the predetermined priority scheme determines the owner process based upon a unique processor identifier for each processor, such that the process that runs on the processor having the lexicographically lowest processor identifier value is preferably selected as the owner process for the resource. If the process is determined to be the owner process for the resource (YES in step 1010), then the logic creates an owner lock for the resource, in step 1012, and sends a response to the other process indicating that the process is the owner process for the resource, in step 1014. If the process is not determined to be the owner process for the resource (NO in step 1010), then the logic creates a reference lock for the resource, in step 1016, sends a response to the other process indicating that the process is not the owner process for the resource, in step 1018, and sends a request to the other process requesting access to the resource, in step 1020. The logic 1000 terminates in step 1099.

A Computer System Having More Than Two Processes

In a computer system having two processes, each process can assume that the other process is, or will be, the owner for a particular resource if the process is not the owner of the resource. Thus, when a process creates a ghost lock, for example, in step 812 as shown and described with reference to FIG. 8 above, the process assumes that the other process will be the owner of the resource, and therefore the ghost lock indicates that the other process owns the resource.

Such an assumption cannot be made when the computer system includes more than two processes. Rather, in a computer system having more than two processes, each remote process must determine whether the local process or another remote process is the owner of the resource. This can be done in many different ways.

One exemplary embodiment of the invention uses an explicit notification mechanism to distribute the resource owner to all remote processes. Specifically, when the local process sends an inquiry, the local process sends the inquiry to all remote processes, and receives from each remote process a response indicating whether the remote process owns the resource. If no remote process owns the resource, then the local process creates an owner lock for the resource. If a remote process owns the resource, then the local process creates a reference lock for the resource indicating the remote process that owns the resource. In either case, the local process sends an explicit owner notification message to all remote processes indicating the owner process for the resource. Each remote process that receives the owner notification message, other than a remote process that owns the resource (if a remote process owns the resource), creates a ghost lock for the resource.

Figure 11:
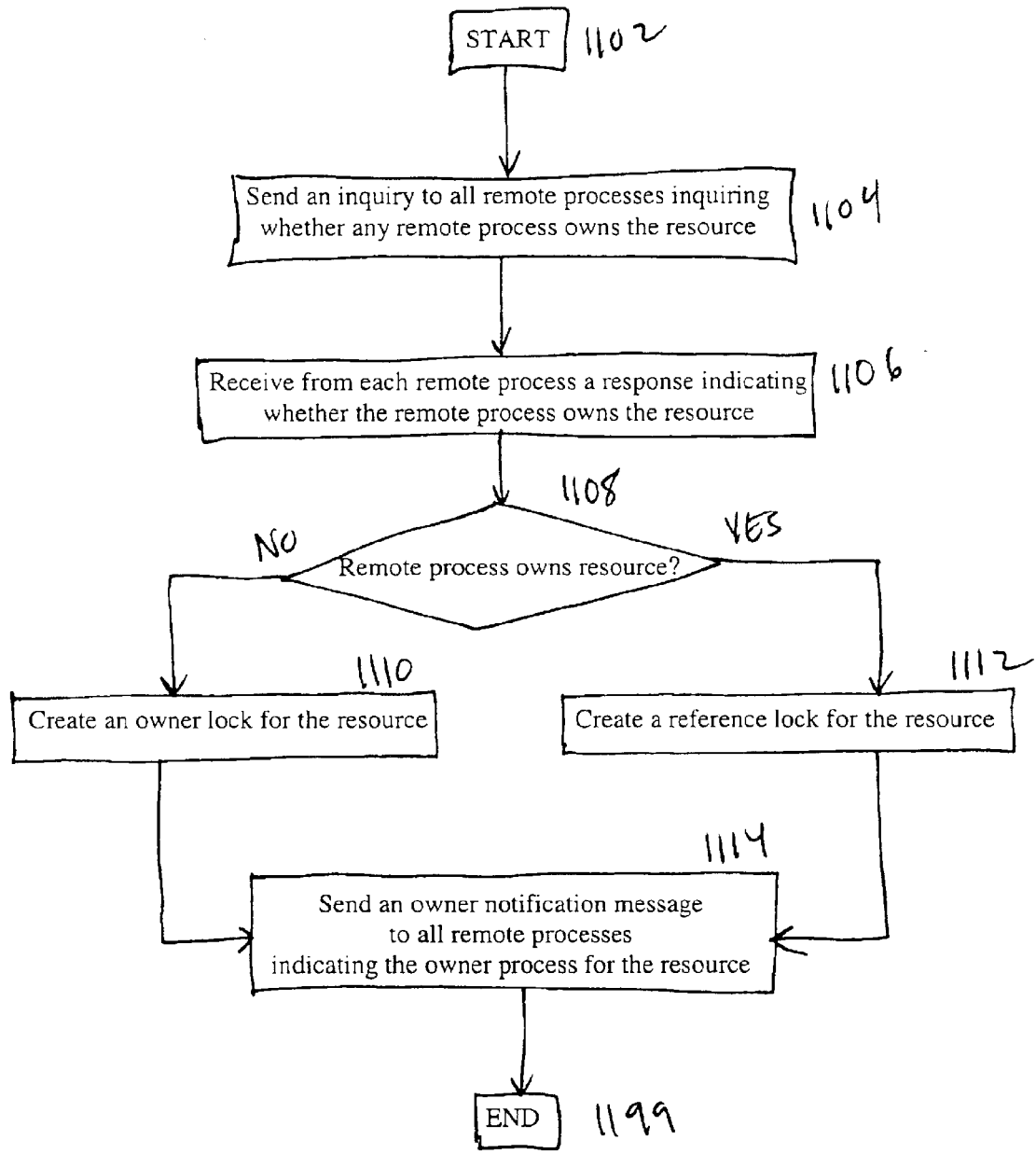
FIG. 11 is a logic flow diagram showing exemplary logic using an explicit notification mechanism to distribute the resource owner to remote processes in accordance with an embodiment of the present invention in which the computer system includes more than two processes.

FIG. 11 is a logic flow diagram showing exemplary local process logic 1100. Beginning at step 1102, the logic sends an inquiry to all remote processes inquiring whether any remote process owns the resource, in step 1104, specifically when the logic requires access to the resource and there is no lock associated with the resource (as in step 714 shown and described with reference to FIG. 7 above). The local process logic then receives from each remote process a response indicating whether the remote process owns the resource, in step 1106. Based upon the responses, the local process logic determines whether any remote process owns the resource, in step 1108. If no remote process owns the resource (NO in step 1108), then the local process logic creates an owner lock for the resource, in step 1110. If a remote process owns the resource (YES in step 1108), then the local process logic creates a reference lock for the resource, in step 1112. In either case, the local process logic sends an owner notification message to all remote processes indicating the owner process for the resource, in step 1114. The local process logic 1100 terminates in step 1199.

Another exemplary embodiment of the invention uses an implicit mechanism to enable the remote processes to determine the resource owner. Specifically, when the local process sends an inquiry, the local process sends the inquiry to all remote processes. All remote process responses are distributed to all processes, including the local process and all remote processes. Therefore, each remote process receives the inquiry from the local process, and also receives from each other remote process a response indicating whether the remote process owns the resource. If a particular remote process determines that no other remote process is the owner for the resource (and assuming the remote process itself is not the owner for the resource), then the remote process creates a ghost lock for the resource indicating that the local process is the owner for the resource. If, however, the remote process determines that another remote process is the onwer for the resource, then the remote process creates a ghost lock for the resource indicating that the other remote process is the owner for the resource.

Figure 12:
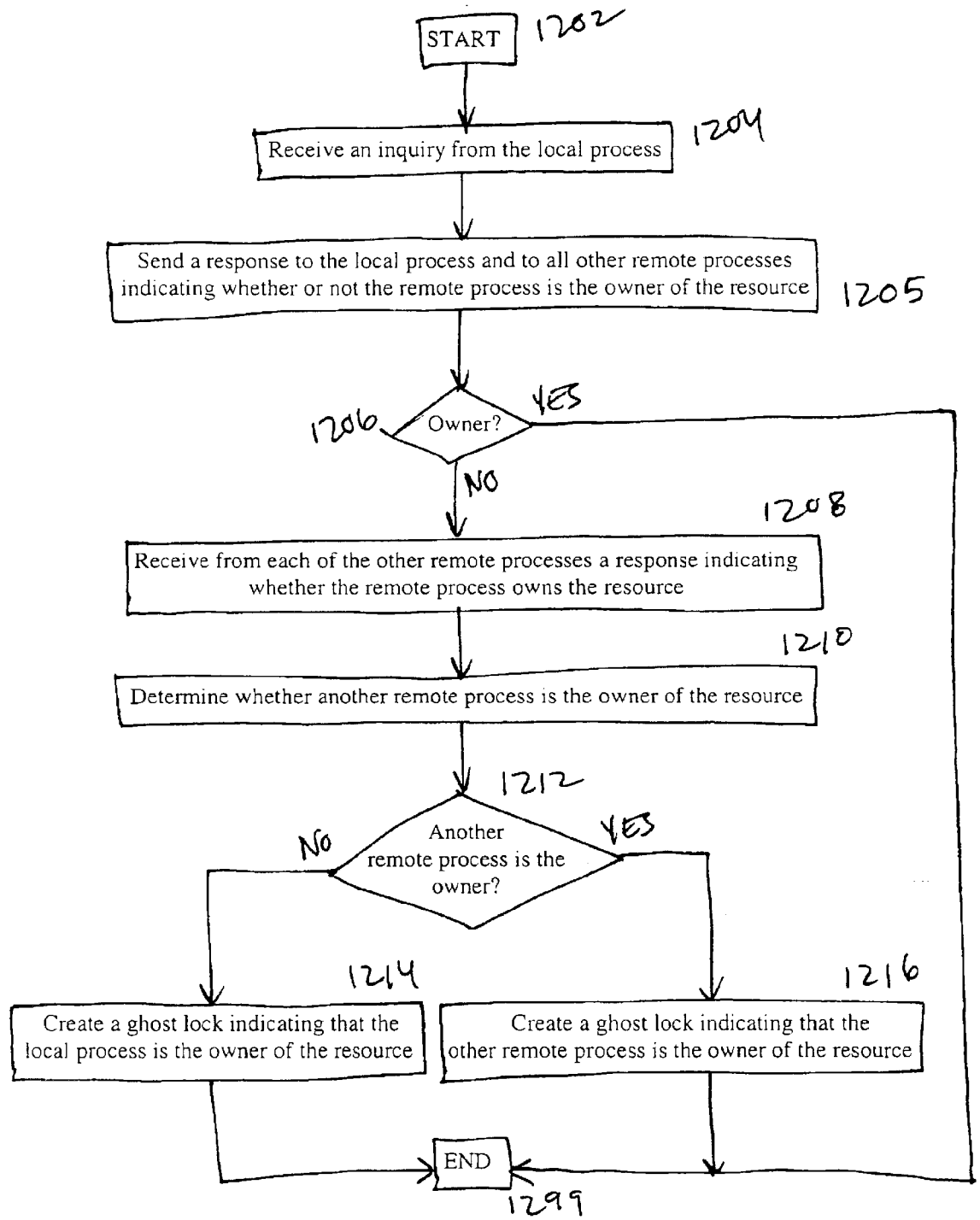
FIG. 12 is a logic flow diagram showing exemplary logic using an implicit mechanism to determine the owner of a resource in accordance with an embodiment of the present invention in which the computer system includes more than two processes.

FIG. 12 is a logic flow diagram showing exemplary remote process logic 1200. Beginning at step 1202, and upon receiving an inquiry from the local process, in step 1204, the remote process logic determines whether the remote process is the owner of the resource, and sends a response to the local process and to all remote processes indicating whether or not the remote process is the owner of the resource, in step 1205. Assuming the remote process logic determines that the remote process is not the owner of the resource (NO in step 1206), then the remote process logic receives from each of the other remote processes a response indicating whether that remote process is the owner of the resource, in step 1208. The remote process logic then determines whether another remote process is the owner of the resource, in step 1210, specifically based upon the responses received from the other remote processes. If no other remote process is the owner of the resource (NO in step 1212), then the remote process logic creates a ghost lock indicating that the local process is the owner of the resource, in step 1214. If another remote process is the owner of the resource (YES in step 1212), then the remote process logic creates a ghost lock indicating that the other remote process is the owner of the resource, in step 1216. The remote process logic 1200 terminates in step 1299.

Mutual Exclusion in a Computer Storage System

In an exemplary embodiment of the present invention, the lock mechanism is used for providing mutual exclusion for resources that are shared among processes running on different storage processors (SPs) in a computer storage system. The computer storage system includes one or more computer storage devices, and each computer storage device includes at least one SP. For convenience, the process in each SP that handles the lock mechanism is referred to as the Distributed Lock Service (DLS) process. The various SPs in the computer storage system are preferably interconnected via a FibreChannel interface. A number of DLS processes communicate over a communication channel (referred to as a "conduit") that is established through peer Communication Management Interface (CMI) processes running on each SP.

Figure 13:
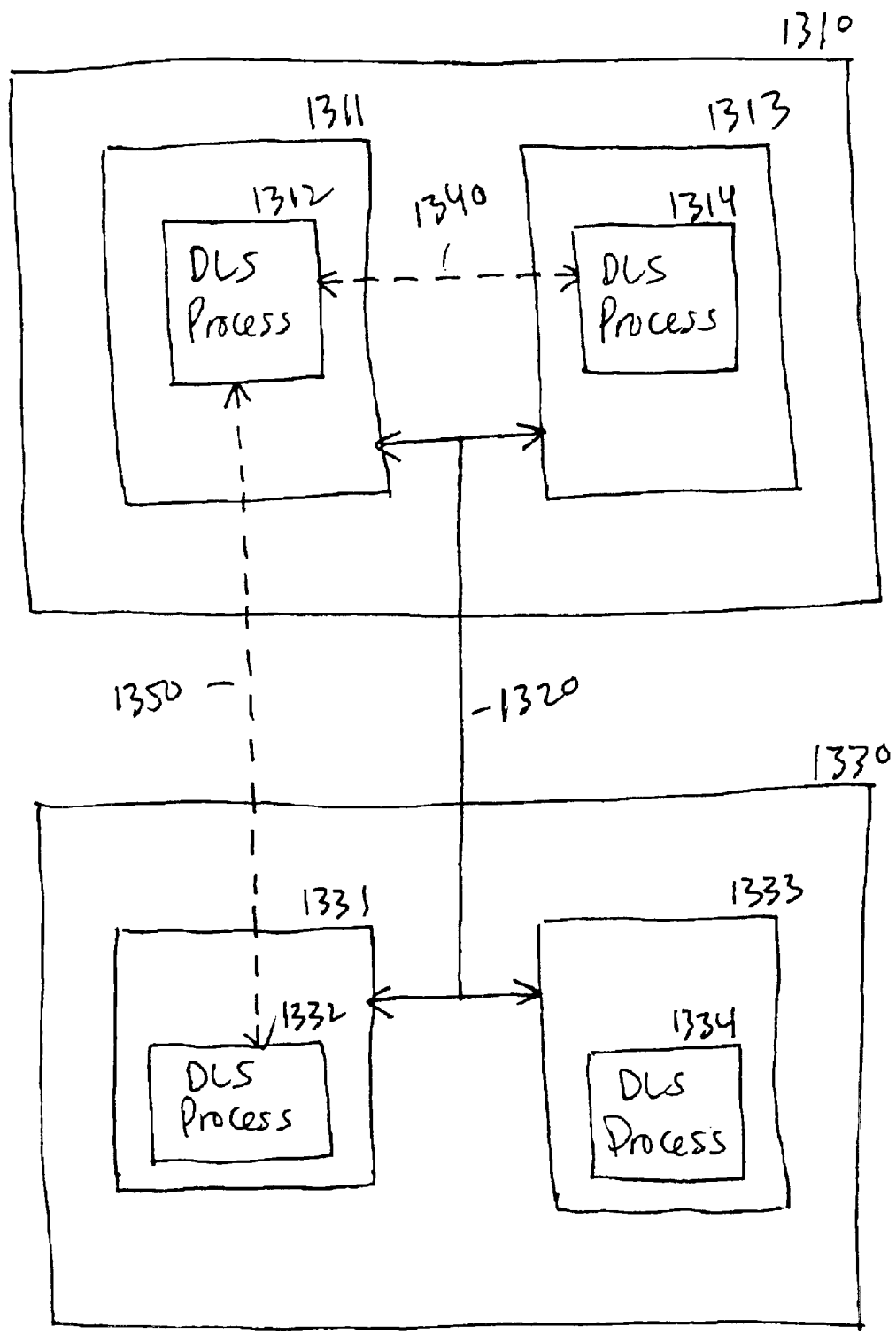
FIG. 13 is a block diagram showing an exemplary computer storage system using a lock mechanism to provide mutual exclusion for resources that are shared among processes running on different storage processors in accordance with an embodiment of the present invention.

FIG. 13 shows an exemplary computer storage system 1300 including two computer storage devices (1310, 1330). Each computer storage device (1310, 1330) includes two SPs. Specifically, the computer storage device 1310 includes a first SP 1311 supporting a first DLS process 1312 and a second SP 1313 supporting a second DLS process 1314. The computer storage device 1330 includes a third SP 1331 supporting a third DLS process 1332 and a fourth SP 1333 supporting a fourth DLS process 1334. All SPs (1311, 1313, 1331, 1333) are interconnected over an interface 1320, which is preferably a FibreChannel interface. In order to communicate using the CMI, each SP (1311, 1313, 1331, 1333) is assigned a unique identifier (CMI_SP_ID) that is used for addressing CMI messages.

In this exemplary embodiment of the present invention, two SPs are permitted to share a resource using the lock mechanism (not shown), although alternative embodiments may permit any number of SPs to share a resource using the lock mechanism. The two SPs can be in the same computer storage device or in different computer storage devices. In one embodiment, the first SP 1311 shares a resource with the second SP 1313, in which case a conduit 1340 is established between the first DLS process 1312 and the second DLS process 1314 over the interface 1320. In another embodiment, the first SP 1311 shares a resource with the third SP 1331, in which case a conduit 1350 is established between the first DLS process 1312 and the third DLS process 1332 over the interface 1320.

Relevant Data Structures Maintained by a DLS Process

Figure 14:
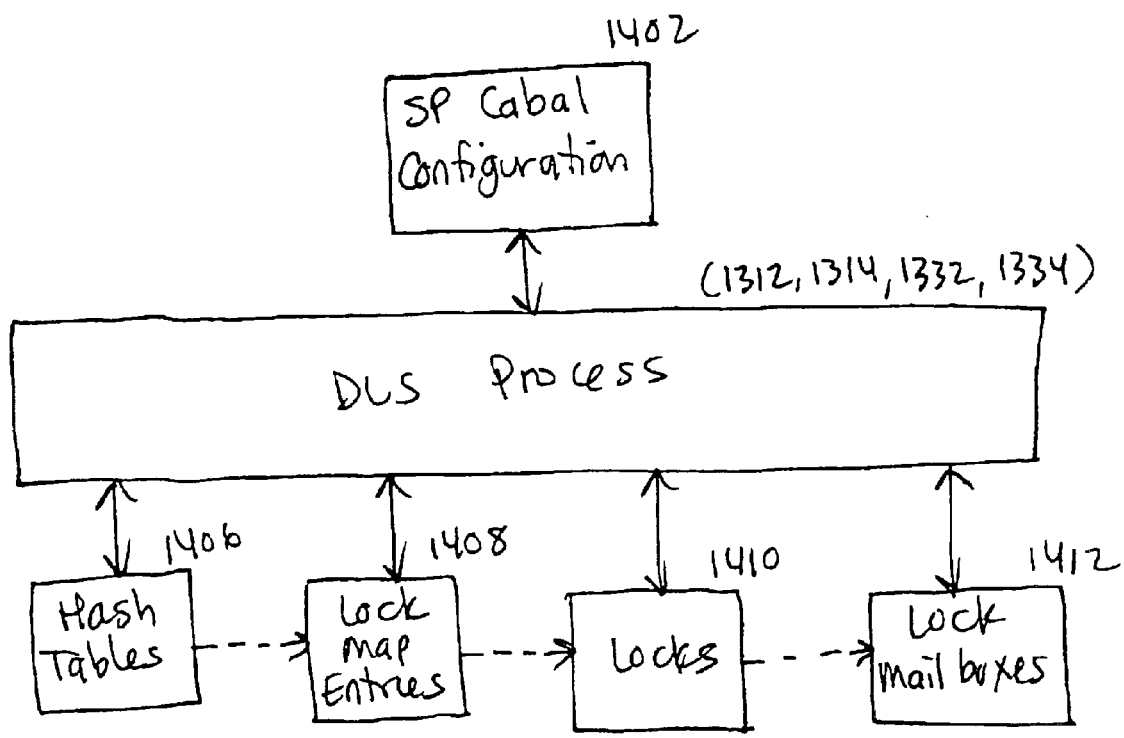
FIG. 14 is a block diagram showing relevant data structures maintained by a distributed lock service process in accordance with an embodiment of the present invention.

FIG. 14 is a block diagram showing relevant data structures maintained by the DLS process (1312, 1314, 1332, 1334). As shown in FIG. 14, the DLS process (1312, 1314, 1332, 1334) maintains a SP Cabal Configuration 1402, hash tables 1406, lock map entries 1408, locks 1410, and lock mailboxes 1412. These data structures are described in detail below, but briefly, the SP Cabal Configuration 1402 is a collection of information about the various SPs that share a particular resource, the shared resources are maintained in lock mailboxes 1412, the locks 1410 are used to coordinate access to the various resources maintained in the lock mailboxes 1412, a lock map entry 1408 is maintained for each lock 1410, and the hash tables 1406 are used to access the lock map entries 1408 using either a lock name or a lock identifier.

The SP Cabal Configuration 1402 is a collection of information about the various SPs that share a particular resource. The group of SPs that share a particular resource is referred to hereinafter as a "cabal." In order for an SP to create a lock for a resource, the SP must be a member of the cabal. Each member SP maintains a SP Cabal Configuration 1402. For each SP in the cabal, the SP Cabal Configuration 1402 includes an SP identifier (not shown), an instantiation counter (not shown), and a state (not shown). The SP identifier uniquely identifies the SP within the cabal, and is preferably an identifier that is used for the CMI service. The instantiation counter indicates a particular instantiation of an SP as described in detail below, and is used for failure detection and recovery. The state indicates whether the SP is in the process of being added to the cabal (INCHOATE), is a full member of the cabal (LIVE), or is in the process of being removed from the cabal (DEFUNCT).

An SP becomes a member of a cabal by joining the cabal. There are two phases in an SP join operation, notification and membership resolution.

In the notification phase, an SP wishing to join the cabal (the joining SP) identifies all other SPs that are associated with the cabal, and sends a "join" request to all such SPs including appropriate identification information. In an exemplary embodiment of the invention in which there are only two SPs in the cabal, the joining SP only needs to identify one other SP. The joining SP may identify the other SP(s), for example, through a predetermined configuration. At this point, the SP's membership in the cabal is considered to be in an "inchoate" state.

When an SP receives a "join" request from the joining SP, it adds the joining SP to its SP Cabal Configuration 1402, and sends a "join" reply to the joining SP including appropriate identifying information.

There is a race condition when more than one SP is "inchoate" at the same point in time. It is possible for an inchoate SP to have issued a "join" request and to be waiting for the "join" reply when it receives a "join" request from another SP. In an exemplary embodiment of the invention, this race condition is resolved by lexicographic comparison of CMI_SP_IDs. The SP having the lexicographically "least" CMI_SP_ID value joins the cabal first, and the other SP joins next. Thus, the processing of the "join" requests will appear to have been serial, with the "winner" having completed joining the cabal before the "loser."

There is also a race condition between the processing of a "join" reply and a "lock open" request received from an existing member of the cabal. The joining SP cannot create a lock for a resource until it is in the "live" state. Therefore, if the joining SP receives a "lock open" request while in the "inchoate" state, the joining SP cannot create a ghost lock for the resource as it would if it was a "live" member of the cabal.

When the joining SP receives a "join" reply, the joining SP adds the replying SP to its SP Cabal Configuration 1402. The joining SP adds information from all replying SPs to its SP Cabal Configuration 1402. At this point, the SP's membership in the cabal is considered to be in a "live" state.

Each SP is associated with an instantiation counter (not shown). The first SP to join the cabal sets its instantiation counter to a default value, such as zero or one. When another SP joins the cabal, the instantiation counters are resolved in the "join" reply. Specifically, if the replying SP has a record of a previous instantiation of the joining SP in its SP Cabal Configuration 1402, the replying SP increments the instantiation counter from that record, and returns the incremented instantiation counter value as the instantiation counter for the joining SP in the "join" reply. If, instead, the replying SP does not have a record of a previous instantiation of the joining SP in its SP Cabal Configuration 1402, then the replying SP returns a default value, such as zero or one, as the instantiation counter for the joining SP in the "join" reply. In either case, the replying SP also sends its own instantiation counter value to the joining SP in the "join" reply. The joining SP stores the instantiation counter for the replying SP in its SP Cabal Configuration 1402.

An SP can leave the cabal gracefully, for example, due to an SP shutdown. The leaving SP closes all locks (any locks owned by the leaving SP will be moved to one of the other SPs as described in detail below), and sends a "leave" notification to the other SPs associated with the cabal. Upon receiving the "leave" notification from the leaving SP, the other SPs associated with the cabal mark the leaving SP as "defunct" by setting the appropriate state in the SP Cabal Configuration 1402.

An SP can also leave the cabal due to a failure of the SP. In this case, the failed SP cannot notify the other SPs that it is leaving the cabal. Instead, each remaining SP detects the failure using a CMI mechanism, and marks the failed SP as "defunct" by setting the appropriate state in the SP Cabal Configuration 1402.

Lock Mailbox Data Structure

Once a cabal is established, a resource can be shared by the cabal members using the subject lock mechanism. In this exemplary embodiment of the invention, the shared resource is maintained in a lock mailbox 1412. FIG. 15 shows an exemplary lock mailbox data structure 1500. The lock mailbox data structure 1500 includes a header field 1502, a size field 1504, a bytes used field 1506, and a data field 1508. The header field 1502 is a private field that is used by the DLS. The size field 1504 indicates the size (in bytes) of the data field 1508. The bytes used field 1506 indicates the number of data bytes in the data field 1508. The data field 1508 is used to store shared data.

Lock Data Structure

During the normal operation of the lock mechanism, various cabal members create a lock for the resource. The lock is essentially a data structure that is maintained in a memory. The owner process creates an owner lock for the resource, while each non-owner process creates a reference lock or ghost lock for the resource. An owner lock is a full instantiation of a lock in which all fields of the lock data structure are used. A reference lock is also a full instantiation of a lock in which all fields of the lock data structure are used. A ghost lock is a partial instantiation of a lock in which only certain fields of the lock data structure are used.

FIG. 16 shows an exemplary lock data structure 1600. The lock data structure 1600 includes a lock name field 1602, a cabal lock identifier field 1604, a home field 1606, a writer field 1608, a readers field 1610, and outstanding requests field 1612, a state field 1614, a mailbox field 1616, a mailbox write count field 1618, a callback field 1620, a frozen requests field 1622, and various flags 1624. Some fields are used in all locks (i.e., owner, reference, ghost), while other fields are used in only owner/reference locks. The lock name field 1602 provides a name for the lock, and is used in both an owner/reference lock and a ghost lock. The cabal lock identifier field 1604 is a unique cabal-wide identifier for the lock, and is used in both an owner/reference lock and a ghost lock. The home field 1606 identifies the owner of the resource, and is used in both an owner/reference lock and a ghost lock. The writer field 1608 indicates the SP, if any, that reserved the resource for writing, and is only used in an owner/reference lock. The readers field 1610 indicates the SP(s), if any, that reserved the resource for reading, and is only used in an owner/reference lock. The outstanding requests field 1612 is a list of outstanding requests for the lock (of which there can be at most one from each cabal member), and is only used in an owner/reference lock. The state field 1614 indicates, among other things, whether the lock is an owner/reference lock or a ghost lock, and is used in both an owner/reference lock and a ghost lock. The mailbox field 1616 is a pointer to a corresponding lock mailbox, and is only used in an owner/reference lock. The mailbox write count field 1618 indicates the number of write accesses granted for the resource, and is only used in an owner/reference lock. The callback field 1620 indicates a callback routine that is called when the DLS changes or needs to change the lock state, and is only used in an owner/reference lock. The frozen requests field 1622 is a list of requests that are received while the lock is frozen during certain lock operations, and is only used in an owner/reference lock. The flags field 1624 includes miscellaneous flags, and is only used in an owner/reference lock. It should be noted that, in an exemplary embodiment of the invention, access to the resource is restricted to either write access or read access at any given time. Only one cabal member may be given write access to the resource at any given time, although multiple cabal members may be given simultaneous read access to the resource.

Lock Map Entry Data Structure

Each SP maintains a lock map entry 1408 for each lock 1410 as well as two hash tables 1406. For convenience, the lock map entries 1408 and the hash tables 1406 are referred to collectively as a lock map. FIG. 17 shows an exemplary lock map entry data structure 1700. The lock map entry data structure 1700 includes a name field 1702, a handle field 1704, and a cabal lock identifier field 1706. The name field 1702 provides a name for the lock. The handle field 1704 is a special identifier that is used internally within the SP. The cabal lock identifier field 1706 is a unique cabal-wide identifier for the lock. The hash tables 1406 include a first hash in table (referred to hereinafter as the "lock name" hash table) that maps each lock name to a hash bucket containing zero or more lock map entries and is used to find a lock map entry based upon a lock name, and a second hash table (referred to hereinafter as the "cabal lock identifier" hash table) that maps each cabal lock identifier to a corresponding hash bucket containing zero or more lock map entries and is used to find a lock map entry based upon a cabal lock identifier. When using a hash table 1406 to find a lock map entry 1408, a process uses the hash table 1406 to find a hash bucket based upon the lock name or the cabal lock identifier, and then inspects each lock map entry 1408 in the hash bucket to determine whether or not there is a lock map entry 1408 corresponding to the lock name or the cabal lock identifier, respectively.

When a process requires access to a particular resource that is identified by a lock name, a lock must first be opened for the resource. Opening the lock establishes an association between the lock name and a lock data structure. In order to open the lock for the resource, the DLS process uses the lock name hash table to search for a lock that is associated with the resource. If the DLS process finds an owner lock for the resource, then the DLS process either grants or denies access to the resource based upon the type of access requested (i.e., read or write) and the lock state. For example, in an exemplary embodiment, access is denied if write access is requested and the resource is already reserved for either read or write access, but access is granted if read access is requested and the resource is already reserved for read access (but not for write access). If the DLS process finds a reference lock or a ghost lock for the resource, then the DLS process sends a request to the resource owner to request access to the resource. If the DLS process does not find a lock for the resource, then the DLS process sends a "lock open" request (i.e., the inquiry) to the other cabal member(s) to inquire whether the resource is owned by another cabal member, and creates either an owner lock, if the resource is not owned by another cabal member, or a reference lock, if the resource is owned by another cabal member. If the DLS process creates a reference lock for the resource, then the DLS process also sends a request to the owner process to request access to the resource.

FIG. 18 is a block diagram showing the fields of an initialized owner or reference lock data structure 1800. The lock name 1802 field indicates the name of the lock. The cabal lock identifier field 1804 indicates the cabal-wide identifier for the lock. The home field 1806 indicates the owner of the lock, which determines whether the lock is an owner lock or a reference lock. The writer field 1808 indicates any SP that reserved the resource for writing. The readers field 1810 indicates any SP(s) that reserved the resource for reading. The outstanding requests field 1812 lists any outstanding requests for the lock (of which there can be at most one from each cabal member). The state field 1814 indicates the state of the lock. The mailbox field 1816 points to a corresponding lock mailbox. The mailbox write count field 1818 indicates the number of write accesses granted for the resource. The callback field 1820 indicates a callback routine that is called when the DLS changes or needs to change the lock state. The frozen requests field 1822 lists any requests that are received while the lock is frozen during certain lock operations. The flags field 1824 includes miscellaneous flags.

In each cabal member that receives the "lock open" request, the DLS process uses the lock name hash table to search for a lock that is associated with the resource. If the DLS process finds an owner lock for the resource, then the DLS process sends a "lock open" response indicating that the SP is the owner of the resource. If the DLS process does not find a lock for the resource, then the DLS process creates a ghost lock for the resource indicating, as the resource owner, the cabal member from which the "lock open" request was received, and sends a "lock open" response indicating that the SP is not the owner of the resource.

FIG. 19 is a block diagram showing the fields of an initialized ghost lock data structure 1900. The lock name 1902 field indicates the name of the lock. The cabal lock identifier field 1904 indicates the cabal-wide identifier for the lock. The home field 1906 indicates the owner of the lock (which, by definition, is another process). The writer field 1908 is NULL. The readers field 1910 is NULL. The outstanding requests field 1912 is NULL. The state field 1914 indicates that the lock is a ghost lock. The mailbox field 1916 is NULL. The mailbox write count field 1918 is NULL. The callback field 1920 is NULL. The frozen requests field 1922 is NULL. The flags field 1924 is NULL.

In a cabal member that receives a request for access to a resource, the DLS process uses the cabal lock identifier hash table to find an owner lock that is associated with the resource. The DLS process then determines whether the resource is locked or unlocked based upon the type of access requested and the lock state. If the resource is locked, then the DLS process sends a response to the requester denying access to the resource. If, however, the resource is unlocked, then the DLS process locks the resource on behalf of the requestor, and sends a response to the requestor granting access to the resource. For example, in an exemplary embodiment, access is denied if write access is requested and the resource is already reserved for either read or write access, but access is granted if read access is requested and the resource is already reserved for read access (but not for write access).

During the normal course of operation of the lock mechanism, it is possible for two DLS processes to begin the investigation procedure for the same resource at roughly the same time. Each DLS process may detect such a "collision" condition, for example, by receiving a "lock open" request from the other DLS process after sending a "lock open" request. Since only one of the DLS processes can be the owner process for the resource, a predetermined priority scheme is used to select the owner process for the resource. In an exemplary embodiment of the invention, this "collision" condition is resolved by lexicographic comparison of CMI_SP_IDs. The DLS process on the SP having the lexicographically "least" CMI_SP_ID value creates an owner lock for the resource, while the DLS process on the other SP creates a reference lock for the resource.

It is possible for the cabal member that initiated an investigation procedure to fail before a lock can be successfully created and moved to another cabal member. When this occurs, the other cabal member(s) will have created a ghost lock for which there is no owner. Such ghost locks must be de-allocated.

An exemplary embodiment of the present invention employs a lazy cleanup mechanism in which obsoleted ghost locks are de-allocated as part of normal lock operations, specifically during the processing of "lock open" requests. As described above, when the DLS process receives a "lock open" request, the DLS process searches for a lock that is associated with the resource. Because the DLS process uses a hash table to search for a lock, the DLS process may inspect more than one lock map entry while searching for a lock that is associated with the resource. If there is at least one "defunct" record in the SP Cabal Configuration 1402, then the DLS process checks each lock map entry that it inspects to determine whether the lock map entry identifies a ghost lock from a "defunct" cabal member, and, if so, de-allocates the ghost lock by removing the ghost lock from the lock map. If there are no "defunct" records in the SP Cabal Configuration 1402 and the DLS process finds a ghost lock that is associated with the resource, then the DLS process determines whether the ghost lock is valid by comparing the lock owner's instantiation counter in the SP Cabal Configuration 1402 to the instantiation counter of the cabal member that sent the "lock open" request, and, if invalid, de-allocates the ghost lock by removing the ghost lock from the lock map. It should be noted that owner locks require no special treatment during the lock open procedure.

During normal operation of the lock mechanism, a lock may be moved from one cabal member (i.e., the previous owner) to another cabal member (i.e., the new owner). This may be done, for example, as part of a graceful shutdown of the previous owner.

In an exemplary embodiment of the invention, the previous owner first freezes the lock. When the lock is frozen, the previous owner does not process any new lock requests (i.e., no new lock requests are added to the outstanding requests field of the lock data structure). Instead, the previous owner captures and stores any new lock requests in the frozen requests field of the lock data structure.

After the previous owner freezes the lock, the previous owner changes the home field of the lock data structure to indicate the new owner of the lock, and sends certain information, including the home field, the write field, the readers field, and the outstanding requests field, to the new owner in a "move" message.

Upon receiving the "move" message from the previous owner, the new owner updates its lock data structure to include the home field, the writer field, the readers field, and the outstanding requests field from the "move" message. The new owner then changes the home field of the lock data structure to indicate the new owner of the lock.

After the new owner has assumed control of the lock, the previous owner forwards all frozen requests to the new owner. The new owner stores the frozen requests in the outstanding requests field of the lock data structure. The new owner the proceeds to process the outstanding requests including the frozen requests received from the previous owner.

In order to complete the move of the lock from the previous owner to the new owner, the previous owner updates its lock data structure to be a ghost lock, and the new owner updates its lock data structure to be an owner lock. If there are more than two cabal members, then the other cabal members are notified that the lock moved, and each such cabal member updates its (ghost) lock data structure to indicate the new owner of the lock.

During normal operation of the lock mechanism, a lock may be reserved for reading or writing. For convenience, a lock that is reserved for reading is said to be in the PREAD state, a lock that is reserved for writing is said to be in the PWRITE state, and a lock that is unreserved is said to be in the NUL state. In order to coordinate access to the lock, certain state transitions are permitted, while other state transitions are not permitted. In an exemplary embodiment of the invention, the lock can be upgraded from the NULL state to either the PREAD state or the PWRITE state, downgraded from either the PREAD state or the PWRITE state to the NULL state, or downgraded from the PWRITE state to the PREAD state. However, the lock may not directly transition from the PREAD state to the PWRITE state, from one PREAD state to another PREAD state (although multiple cabal members can be granted read access concurrently), or from one PWRITE state to another PWRITE state, without first being downgraded to the NULL state.

When a process ("the caller") on a particular cabal member ("the caller SP") requests access to a resource, the caller SP first makes a local copy of the lock request for use in case the lock owner fails. The caller SP then uses a hash table to search for a lock that is associated with the resource. If the caller SP finds an owner lock, in which case the caller SP is the lock owner, the caller SP processes the lock request. If the caller SP finds a ghost lock, then the caller SP forwards the lock request to the lock owner identified by the home field of the lock data structure.

The lock owner (whether the caller SP or another cabal member) decides whether to grant the lock request or deny the lock request based upon the lock state and the type of access requested by the caller. If the lock request does not conflict with the lock state, then the lock owner grants the lock request. For example, the lock owner grants the lock request if the lock request is for write access and the lock state is NULL, or the lock request is for read access and the lock state is either NULL or PREAD. Otherwise, the lock owner must downgrade the lock state in order to grant the lock request.

In order to grant the lock request, the lock owner causes the caller's callback routine to be invoked. If the caller SP is the lock owner, then the DLS process simply invokes the caller's callback routine. If the caller SP is not the lock owner, then the DLS process on the lock owner sends a message to the DLS process on the caller SP, which in turn invokes the caller's callback routine.

In order to downgrade the lock state, the lock owner contacts all processes that have outstanding reservations for the resource in order to determine whether the lock state can be downgraded. There can be only one process with write access, but there can be multiple processes with read access. The process(es) can be on the caller SP, the lock owner, or another cabal member if there are more than two cabal members. If a process is on the lock owner, then the DLS process on the lock owner invokes the process' callback routine in order to determine whether the process will accept a downgrade. If a process is on another cabal member, then the DLS process on the lock owner sends a message to the DLS process on the other cabal member, which in turn invokes the process' callback routine in order to determine whether the process will accept a downgrade. Assuming the lock owner is able to downgrade the lock state, the lock owner grants the lock request.

When a cabal member ("the caller SP") no longer needs a particular lock, the caller SP closes the lock. If the caller SP is not the lock owner, then the DLS process on the caller SP sends a "close notification" message to the lock owner. If the caller SP is the lock owner and another cabal member had opened the lock, then the DLS process on the caller SP moves the lock to another cabal member.

Although a preferred embodiment of the invention creates a ghost lock upon receiving an inquiry, the present invention is in no way limited to the use or creation of a ghost lock. An embodiment of the present invention creates a lock upon receiving an inquiry. This lock may be a ghost lock, a full reference lock, or other data structure that indicates or identifies the owner process for the resource.

In an exemplary embodiment of the present invention, predominantly all of the logic for providing mutual exclusion for resources in a computer system as described herein is implemented as a set of computer program instructions that are stored in a computer readable medium and executed by an embedded microprocessor system within the computer system. Various embodiments of the invention may be implemented in any conventional computer programming language. For example, an embodiment may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The present invention may be embodied in other specific forms without departing from the essence or essential characteristics. The described embodiments are to be considered in all respects only as illustrative and not restrictive.

I claim:

1. A method for providing mutual exclusion for a resource in a computer system having a plurality of processes, the method comprising:

maintaining a resource lock for each process requiring access to the resource, the resource lock having a plurality of fields requiring initialization in order for the process to access the resource, the plurality of fields including an owner indicator field for indicating an owner process for the resource;

receiving, by a first process, an inquiry from a second process inquiring whether the first process owns the resource;

determining, by the first process, an owner process for the resource other than the first process;

creating a ghost lock for the first process, wherein the ghost lock is a partial instantiation of a resource lock having at least the owner indicator field initialized to indicate the owner process determined for the resource but having less than all fields initialized, and wherein the ghost lock allows the first process to identify the owner process for the resource without first sending an inquiry message to determine the owner process;

sending, by the second process, an inquiry to a third process inquiring whether the third process owns the resource;

receiving, by the second process, a response from the third process indicating whether the third process is the owner process for the resource;

determining, by the second process, that the second process is the owner process for the resource, if the response indicates that the third process is not the owner process for the resource;

creating an owner lock for the second process if the second process is the owner process for the resource, wherein the owner lock is a resource lock having all fields initialized and the owner indicator field indicating that the second process is the owner process for the resource; and creating a reference lock for the second process if the third process is the owner process for the resource, wherein the reference lock is a resource lock having all fields initialized and the owner indicator field indicating that the third process is the owner process for the resource.

2. The method of claim 1, further comprising:

sending, by the second process, an owner notification message to the first process indicating the owner process for the resource, the owner process being one of the second process and the third process.

3. The method of claim 2, wherein determining the owner process by the first process comprises:

determining the owner process for the resource based upon the owner notification message.

4. The method of claim 1, further comprising:

determining that the first process requires access to the resource;

identifying, by the first process, the owner process for the resource using the ghost lock; and sending, by the first process, a request message to the owner process requesting access to the resource without first sending an inquiry message to determine the owner process.

5. The method of claim 4, wherein identifying the owner process for the resource using the ghost lock comprises:

finding the ghost lock among a plurality of resource locks based upon a resource identifier; and obtaining the owner process from the owner indicator field of the ghost lock.

6. The method of claim 4, further comprising:

converting the ghost lock to a reference lock by initializing all uninitialized fields of the lock.

7. A computer system comprising a plurality of processes sharing a resource, wherein:

a resource lock is maintained for each process requiring access to the resource, the resource lock having a plurality of fields requiring initialization in order for the process to access the resource, the plurality of fields including an owner indicator field for indicating an owner process for the resource;

a first process receives an inquiry from a second process inquiring whether the first process owns the resource;

the first process determines an owner process for the resource other than the first process;

a ghost lock is created for the first process, wherein the ghost lock is a partial instantiation of a resource lock having at least the owner indicator field initialized to indicate the owner process determined for the resource but having less than all fields initialized, and wherein the ghost lock allows the first process to identify the owner process for the resource without first sending an inquiry message to determine the owner process;

the second process sends an inquiry to a third process inquiring whether the third process owns the resource;

the second process receives a response from the third process indicating whether the third process is the owner process for the resource;

the second process determines that it is the owner process for the resource, if the response indicates that the third process is not the owner process for the resource;

an owner lock is created for the second process if the second process is the owner process for the resource, wherein the owner lock is a resource lock having all fields initialized and the owner indicator field indicating that the second process is the owner process for the resource; and a reference lock is created for the second process if the third process is the owner process for the resource, wherein the reference lock is a resource lock having all fields initialized and the owner indicator field indicating that the third process is the owner process for the resource.

8. The computer system of claim 7, wherein:

the second process sends an owner notification message to the first process indicating the owner process for the resource, the owner process being one of the second process and the third process.

9. The computer system of claim 8, wherein the first process determines the owner process for the resource based upon the owner notification message.

10. The computer system of claim 7, wherein:

the first process identifies the owner process for the resource using the ghost lock upon requiring access to the resource and sends a request message to the owner process requesting access to the resource without first sending an inquiry message to determine the owner process.

11. The computer system of claim 10, wherein the first process identifies the owner process using the ghost lock by finding the ghost lock among a plurality of resource locks based upon a resource identifier and obtaining the owner process from the owner indicator field of the ghost lock.

12. The computer system of claim 10, wherein the first process converts the ghost lock to a reference lock by initializing all uninitialized fields of the lock.

* * * * *